US007543448B2

(12) United States Patent
Nakamura et al.

(10) Patent No.: US 7,543,448 B2

(45) Date of Patent: Jun. 9, 2009

(54) CONTROL SYSTEM FOR HYDRAULIC CONSTRUCTION MACHINE

(75) Inventors: Kazunori Nakamura, Tsuchiura (JP); Kouji Ishikawa, Kasumigaura (JP); Nobuei Ariga, Tsuchiura (JP); Hideo Karasawa, Tsuchiura (JP); Yasuo Okano, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 502 days.

(21) Appl. No.: 10/585,983

(22) PCT Filed: Oct. 5, 2005

(86) PCT No.: PCT/JP2005/018437

§ 371 (c)(1),
(2), (4) Date: Jul. 13, 2006

(87) PCT Pub. No.: WO2006/040975

PCT Pub. Date: Apr. 20, 2006

(65) Prior Publication Data

US 2008/0245065 A1 Oct. 9, 2008

(30) Foreign Application Priority Data

Oct. 13, 2004 (JP) ............................ 2004-299084

(51) Int. Cl.
*F16D 31/02* (2006.01)

(52) U.S. Cl. ............................ 60/434; 60/431; 60/452

(58) Field of Classification Search .................. 60/431, 60/434, 449, 452
See application file for complete search history.

(56) References Cited

U.S. PATENT DOCUMENTS

| | | | | |
|---|---|---|---|---|
| 5,638,677 | A * | 6/1997 | Hosono et al. | 60/434 |
| 5,930,996 | A | 8/1999 | Nakamura et al. | |
| 6,183,210 | B1 * | 2/2001 | Nakamura | 60/431 |
| 6,823,672 | B2 * | 11/2004 | Nakamura | 60/452 |
| 7,255,088 | B2 * | 8/2007 | Nakamura et al. | 123/352 |

FOREIGN PATENT DOCUMENTS

| | | |
|---|---|---|
| JP | 5-10269 | 1/1993 |
| JP | 9-68169 | 3/1997 |
| JP | 2989749 | 12/1999 |
| JP | 2001-329883 | 11/2001 |
| JP | 3419661 | 3/2003 |
| JP | 2001-90574 | 4/2003 |
| JP | 3538001 | 6/2004 |
| JP | 2004-190582 | 7/2004 |

* cited by examiner

*Primary Examiner*—Michael Leslie
(74) *Attorney, Agent, or Firm*—Mattingly & Malur, P.C.

(57) ABSTRACT

A computing section computes a reference revolution-speed decrease modification amount DNLR; and multiplies an engine revolution speed modification gain KNL by a reference revolution-speed decrease modification amount DNL and then DNLR, to thereby compute an engine revolution-speed decrease modification amount DND based on input change of an operation pilot pressure, which is modified in accordance with DNLR. At the time when a lever operation input from an operation command unit is changed from full stroke to half stroke, if a pump delivery pressure is in a pressure range of a pump absorption torque control region Y where the pump delivery pressure is lower than that in a region X, the reference revolution-speed decrease modification amount computing section 700*v* computes the modification amount DNLR to be 0, and therefore lowering of a target engine revolution speed with auto-acceleration control is not caused.

11 Claims, 14 Drawing Sheets

MATCHING POINT OF EMGINE TORQUE IN PRIOR ART

ENGINE OUTPUT POWER IN PRIOR ART

PUMPING RATE CHARACTERISTIC
IN PRIOR ART

MATCHING POINT OF EMGINE TORQUE IN INVENTION

ENGINE OUTPUT POWER IN INVENTION

PUMPING RATE CHARACTERISTIC IN INVENTION

CONTROL SYSTEM FOR HYDRAULIC CONSTRUCTION MACHINE

This application is a 371 of PCT Application No. PCT/JP2005/018437, filed Oct. 5, 2005, which claims priority to Japanese Patent Application No. 2004-299084, filed Oct. 13, 2004.

TECHNICAL FIELD

The present invention relates to a control system for a hydraulic construction machine. More particularly, the present invention relates to a control system for a hydraulic construction machine, such as a hydraulic excavator, in which a hydraulic actuator is driven by a hydraulic fluid delivered from a hydraulic pump rotated by an engine, to thereby perform necessary work, and which includes an auto-acceleration system for increasing an engine revolution speed depending on an operation input from a control lever.

BACKGROUND ART

In general, a hydraulic construction machine, such as a hydraulic excavator, includes a diesel engine as a prime mover. At least one variable displacement hydraulic pump is rotated by the engine, and a plurality of hydraulic actuators are driven by a hydraulic fluid delivered from the hydraulic pump, thus performing necessary work. The diesel engine is provided with input means for commanding a target revolution speed, e.g., a throttle dial, to control a fuel injection amount in accordance with the target revolution speed, whereby the revolution speed is controlled. Also, the hydraulic pump is provided with absorption torque control means for horsepower control to control a pump tilting to be reduced such that pump absorption torque will not exceed a preset value (maximum absorption torque) when the pump delivery pressure rises.

Regarding that type of hydraulic construction machine, a technique for the so-called auto-acceleration control is disclosed in Japanese Patent No. 3419661, for example. The term "auto-acceleration control" means a technique of lowering the target revolution speed of the engine to save energy when an operation input from a control lever is small, and of raising the target revolution speed of the engine to ensure workability when the lever operation input is increased.

Patent Document 1: Japanese Patent No. 3419661

DISCLOSURE OF THE INVENTION

Problems to be Solved by the Invention

With the known auto-acceleration control, when the operation input from the control lever serving as operation command means is changed from full stroke to half stroke, a pump maximum delivery rate is reduced corresponding to the lowering of the engine revolution speed over an entire range of the pump delivery pressure.

However, when the pump delivery pressure is low, the pump consumption horsepower is also small and the engine output horsepower is within the capacity. If the pump maximum delivery rate is reduced in such a situation, the engine output power cannot be efficiently utilized. Also, a reduction of the pump maximum delivery rate decreases an actuator maximum speed and hence reduces working efficiency.

Further, in the pump absorption torque control by the absorption torque control means associated with the hydraulic pump, the maximum absorption torque is set in many cases such that the engine output torque will not be maximized when the engine revolution speed is at a maximum. In such a case, when the lever operation input is changed from full stroke to half stroke and the engine output power is reduced with the auto-acceleration control, there occurs a state that an allowance of the engine output torque is increased and the engine output horsepower is also well within the capacity.

Thus, in the prior art, when the engine revolution speed is lowered with the auto-acceleration control, the pump maximum delivery rate is reduced and the actuator maximum speed is decreased in spite of the engine output torque being within the capacity. This raises the problem that the engine output power cannot be effectively utilized and the working efficiency is reduced.

A similar problem arises when the engine revolution speed is lowered by selecting an economy mode in mode selection control.

An object of the present invention is to provide a control system for a hydraulic construction machine, which can ensure an energy saving effect, realize effective utilization of engine output power, and increase working efficiency by increasing and decreasing the engine revolution speed with an implement, e.g., auto-acceleration control, other than input means such as a throttle dial.

Means for Solving the Problems (1) To achieve the above object, the present invention provides a control system for a hydraulic construction machine comprising a prime mover; at least one variable displacement hydraulic pump driven by the prime mover; at least one hydraulic actuator driven by a hydraulic fluid from the hydraulic pump; input means for commanding a reference target revolution speed of the prime mover; revolution speed control means for controlling a revolution speed of the prime mover; and operation command means for commanding operation of the hydraulic actuator, wherein the control system comprises target revolution speed setting means for setting a target revolution speed of the revolution speed control means based on the reference target revolution speed; operation detecting means for detecting a command input from the operation command means; and load pressure detecting means for detecting a load pressure of the hydraulic pump, and wherein the target revolution speed setting means comprises a first modifying section for changing the target revolution speed depending on the command input from the operation command means, which is detected by the operation detecting means; and a second modifying section for modifying change of the target revolution speed, which is given by the first modifying section, depending on the load pressure detected by the load pressure detecting means.

Since the first modifying section changes the target revolution speed depending on the command input from the operation command means, which is detected by the operation detecting means, auto-acceleration control can be performed in which the engine revolution speed is increased and decreased in accordance with the command input from the operation command means.

Since the second modifying section modifies change of the target revolution speed, which is given by the first modifying section, depending on the load pressure detected by the load pressure detecting means, it becomes possible to, in the case of the load pressure (delivery pressure) of the hydraulic pump being low, avoid the engine revolution speed from being lowered with the modification made by the first modifying section (i.e., with the auto-acceleration control) when the command input from the operation command means (i.e., a lever operation input) is changed from full stroke to half stroke.

As a result, the control system can ensure an energy saving effect, realize effective utilization of engine output power, and increase working efficiency by increasing and decreasing the engine revolution speed (depending on the operation input from the operation command means) with an implement other than input means such as a throttle dial.

(2) In above (1), preferably, the second modifying section modifies the change of the target revolution speed, which is given by the first modifying section, to be a minimum when the load pressure detected by the load pressure detecting means is lower than a certain value.

With that feature, in the case of the load pressure (delivery pressure) of the hydraulic pump being low, it is possible to avoid the engine revolution speed from being lowered with the modification made by the first modifying section (i.e., with the auto-acceleration control) when the command input from the operation command means (i.e., the lever operation input) is changed from full stroke to half stroke.

(3) In above (1), preferably, the control system for the hydraulic construction machine further comprises pump absorption torque control means for making control to reduce a displacement of the hydraulic pump corresponding to a rise of the load pressure of the hydraulic pump such that maximum absorption torque of the hydraulic pump does not exceed a setting value, wherein the second modifying section modifies the change of the target revolution speed, which is given by the first modifying section, to be a minimum in a control region of the pump absorption torque control means where the load pressure of the hydraulic pump is lower than that in another region thereof.

With that feature, in the control region of the pump absorption torque control means where the load pressure (delivery pressure) of the hydraulic pump is lower than that in another region thereof, it is possible to avoid the engine revolution speed from being lowered with the modification made by the first modifying section (i.e., with the auto-acceleration control) when the command input from the operation command means (i.e., the lever operation input) is changed from full stroke to half stroke.

(4) In above (1), preferably, the control system for the hydraulic construction machine further comprises pump absorption torque control means for, when the load pressure of the hydraulic pump becomes higher than a first value, making control to reduce a displacement of the hydraulic pump corresponding to a rise of the load pressure of the hydraulic pump such that maximum absorption torque of the hydraulic pump does not exceed a setting value, wherein the second modifying section modifies the change of the target revolution speed, which is given by the first modifying section, to be a minimum when the load pressure detected by the load pressure detecting means is lower than a second value, the second value being set to near the first value.

With that feature, in the control region of the pump absorption torque control means where the load pressure (delivery pressure) of the hydraulic pump is lower than that in another region thereof, it is possible to avoid the engine revolution speed from being lowered with the modification made by the first modifying section (i.e., with the auto-acceleration control) when the command input from the operation command means (i.e., the lever operation input) is changed from full stroke to half stroke.

(5) In above (1), preferably, the second modifying section computes a revolution speed modification value which is changed depending on the load pressure detected by the load pressure detecting means, thereby modifying the change of the target revolution speed, which is given by the first modifying section, in accordance with the computed revolution speed modification value.

(6) In above (1), preferably, the first modifying section includes first means for computing a first revolution speed modification value corresponding to the operation input from the operation command means, which is detected by the operation detecting means, the second modifying section includes second means for computing a second revolution speed modification value corresponding to the magnitude of the load pressure detected by the load detecting means and third means for executing computation based on the first revolution speed modification value and the second revolution speed modification value, to thereby obtain a third revolution speed modification value, and the first and second modifying sections further include fourth means for executing computation based on the third revolution speed modification value and the reference target revolution speed, to thereby obtain the target revolution speed.

(7) In above (6), preferably, the first means is means for computing, as the first revolution speed modification value, a first modification revolution speed, the second means is means for computing, as the second revolution speed modification value, a modification coefficient, the third means is means for multiplying the first modification revolution speed by the modification coefficient to obtain, as the third revolution speed modification value, a second modification revolution speed, and the fourth means is means for subtracting the second modification revolution speed from the reference target revolution speed.

(8) In above (7), preferably, the second means computes the modification coefficient such that the modification coefficient is 0 when a magnitude of the load pressure is smaller than a preset first value, the modification coefficient is increased from 0 when the magnitude of the load pressure exceeds the first value, and the modification coefficient becomes 1 when the magnitude of the load pressure reaches a preset second value.

(9) In above (1), preferably, the control system for the hydraulic construction machine further comprises pump absorption torque control means for making control to reduce a displacement of the hydraulic pump corresponding to a rise of the load pressure of the hydraulic pump such that maximum absorption torque of the hydraulic pump does not exceed a setting value; and maximum absorption torque modifying means for modifying the setting value to increase the maximum absorption torque of the hydraulic pump when the target revolution speed is modified to be lower than a preset rated revolution speed by the first modifying section.

With that feature, when the target revolution speed becomes lower than the rated revolution speed with the modification made by the first modifying section (i.e., with the auto-acceleration control), the maximum absorption torque of the hydraulic pump is controlled so as to increase, whereby the maximum target displacement of the hydraulic pump is increased. Accordingly, even when the engine revolution speed is lowered with the auto-acceleration control, the maximum delivery rate of the hydraulic pump is hardly reduced. It is hence possible to ensure the maximum speed of the actuator and to increase the working efficiency. Also, although the maximum absorption torque is increased with the lowering of the target revolution speed, engine output power can be effectively utilized in an engine, which outputs maximum torque at a revolution speed lower than the maximum rated revolution speed, by reducing a decrease amount of the maximum delivery rate of the hydraulic pump. In addition, since the engine revolution speed is lowered, fuel economy is improved.

(10) Further, to achieve the above object, the present invention provides a control system for a hydraulic construction machine comprising a prime mover; at least one variable displacement hydraulic pump driven by the prime mover; at least one hydraulic actuator driven by a hydraulic fluid from the hydraulic pump; input means for commanding a reference target revolution speed of the prime mover; and revolution speed control means for controlling a revolution speed of the prime mover, wherein the control system comprises target revolution speed setting means for setting, separately from the target revolution speed set based on the reference target revolution speed, a target revolution speed of the revolution speed control means to a revolution speed lower than a maximum rated revolution speed; pump absorption torque control means for making control to reduce a displacement of the hydraulic pump corresponding to a rise of the load pressure of the hydraulic pump such that maximum absorption torque of the hydraulic pump does not exceed a setting value; and maximum absorption torque modifying means for modifying the setting value of the maximum absorption torque such that when the target revolution speed of the revolution speed control means is set by the target revolution speed setting means to the revolution speed lower than the maximum rated revolution speed, the maximum absorption torque of the hydraulic pump is increased from the maximum absorption torque resulting when the target revolution speed of the revolution speed control means is at the maximum rated revolution speed, thus minimizing an amount of decrease of a maximum delivery rate of the hydraulic pump with the increase of the maximum absorption torque.

With that feature, when the target revolution speed becomes lower than the rated revolution speed, the control is performed such that the maximum absorption torque of the hydraulic pump is increased and the decrease amount of the maximum delivery rate of the hydraulic pump is minimized. It is therefore possible to ensure the maximum speed of the actuator and to increase the working efficiency. Also, although the maximum absorption torque is increased with the lowering of the target revolution speed, engine output power can be effectively utilized in an engine, which outputs maximum torque at a revolution speed lower than the maximum rated revolution speed, by reducing the decrease amount of the maximum delivery rate of the hydraulic pump. In addition, since the engine revolution speed is lowered, fuel economy is improved.

(11) Further, to achieve the above, the present invention provides a control system for a hydraulic construction machine comprising a prime mover; at least one variable displacement hydraulic pump driven by the prime mover; at least one hydraulic actuator driven by a hydraulic fluid from the hydraulic pump; input means for commanding a reference target revolution speed of the prime mover; revolution speed control means for controlling a revolution speed of the prime mover; and operation command means for commanding operation of the hydraulic actuator, wherein the control system comprises operation detecting means for detecting a command input from the operation command means; target revolution speed setting means for modifying the reference target revolution speed corresponding to the command input from the operation command means, which is detected by the operation detecting means, and setting a target revolution speed of the revolution speed control means; pump absorption torque control means for making control to reduce a displacement of the hydraulic pump corresponding to a rise of the load pressure of the hydraulic pump such that maximum absorption torque of the hydraulic pump does not exceed a setting value; and maximum absorption torque modifying means for modifying the setting value of the maximum absorption torque such that when the target revolution speed of the revolution speed control means is set by the target revolution speed setting means to a revolution speed lower than a maximum rated revolution speed, the maximum absorption torque of the hydraulic pump is increased from the maximum absorption torque resulting when the target revolution speed of the revolution speed control means is at the maximum rated revolution speed, thus minimizing an amount of decrease of a maximum delivery rate of the hydraulic pump with the increase of the maximum absorption torque.

With that feature, when the target revolution speed becomes lower than the rated revolution speed, the control is performed such that the maximum absorption torque of the hydraulic pump is increased and the decrease amount of the maximum delivery rate of the hydraulic pump is minimized. It is therefore possible to ensure the maximum speed of the actuator and to increase the working efficiency. Also, although the maximum absorption torque is increased with the lowering of the target revolution speed, engine output power can be effectively utilized in an engine, which outputs maximum torque at a revolution speed lower than the maximum rated revolution speed, by reducing the decrease amount of the maximum delivery rate of the hydraulic pump. In addition, since the engine revolution speed is lowered, fuel economy is improved.

Advantages of the Invention

According to the present invention, it is possible to ensure an energy saving effect, to realize effective utilization of engine output power, and to increase working efficiency by increasing and decreasing the engine revolution speed with control, e.g., auto-acceleration control, other than that using input means such as a throttle dial.

REFERENCE NUMERALS

Figure 1:
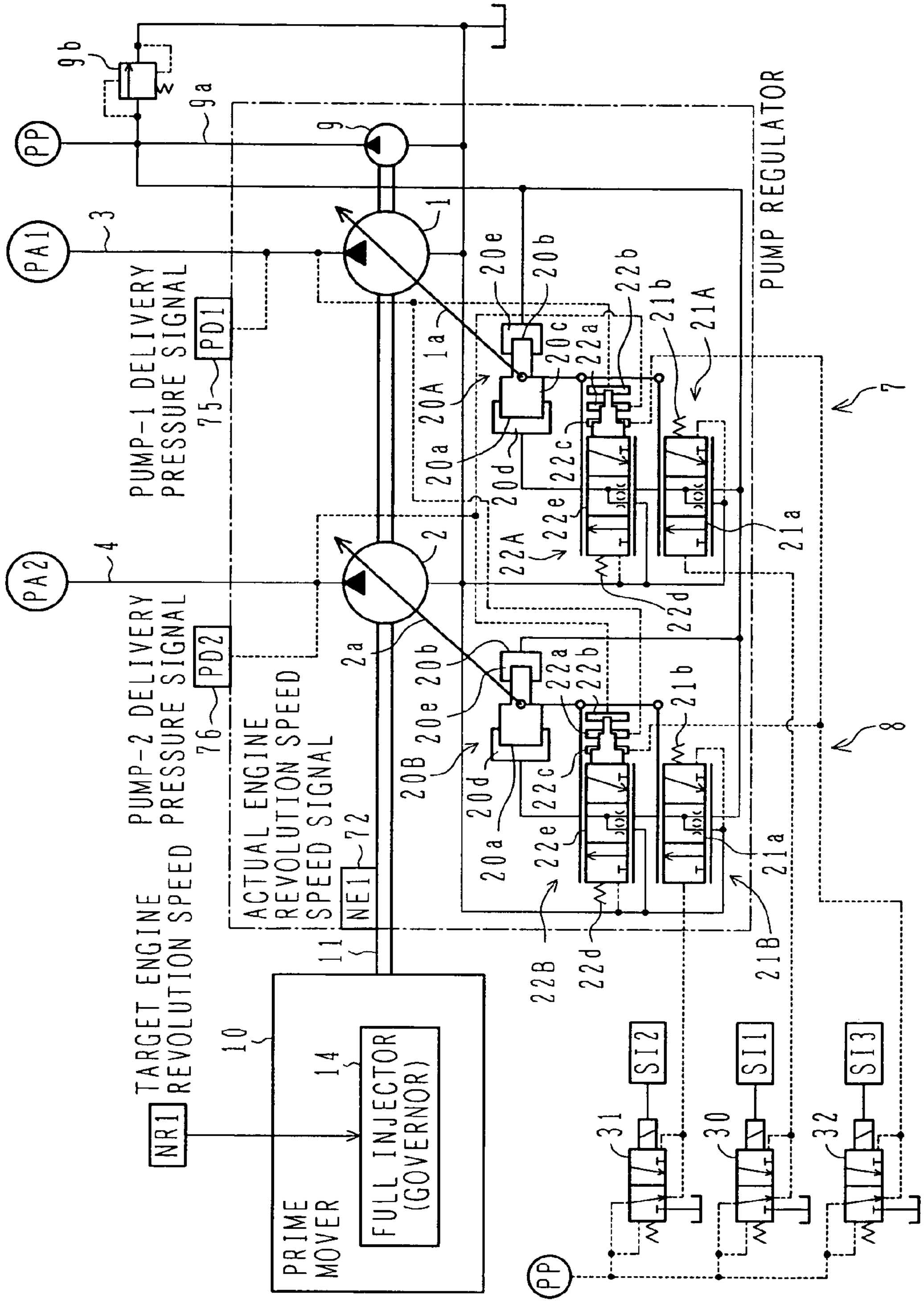
FIG. 1 is a block diagram showing a prime mover and a hydraulic pump control unit, including an auto-acceleration system according to one embodiment of the present invention.

1, 2 hydraulic pumps
1*a*, 2*a* swash plates
5 valve unit
7, 8 regulators
10 prime mover
14 fuel injector
20A, 20B tilting actuators
21A, 21B first servo valves
22A, 22B second servo valves
30-32 solenoid control valves
38-44 operation pilot devices
50-56 actuators
70 controller
70*a*, 70*b* reference pumping rate computing sections
70*c*, 70*d* target pumping rate computing sections
70*e*, 70*f* target pump tilting computing sections
70*g*, 70*h* output pressure computing sections
70*k*, 70*m* solenoid output current computing sections
70*i* pump maximum torque computing section
70*j* output pressure computing section
70*n* solenoid output current computing section
700*a* reference revolution-speed decrease modification amount computing section
700*b* reference revolution-speed increase modification amount computing section
700*c* maximum value selecting section
700*d*1-700*d*6 engine-revolution-speed modification gain computing sections
700*e* minimum value selecting section
700*f* hysteresis computing section
700*g* control-lever-based engine-revolution-speed modification amount computing section
700*h* first reference target engine-revolution-speed modifying section
700*i* maximum value selecting section
700*j* hysteresis computing section
700*k* pump delivery pressure signal modifying section
700*m* modification gain computing section
700*n* maximum value selecting section
700*p* modification gain computing section
700*q* first pump-delivery-pressure-based engine-revolution-speed modification amount computing section
700*r* second pump-delivery-pressure-based engine-revolution-speed modification amount computing section
700*s* maximum value selecting section
700*t* second reference target engine-revolution-speed modifying section
700*u* limiter computing sections
700*v* reference revolution-speed decrease modification amount computing section

BEST MODE FOR CARRYING OUT THE INVENTION

An embodiment of the present invention will be described below with reference to the drawings. The following embodiment represents the case where the present invention is applied to a prime mover and a hydraulic pump control unit in a hydraulic excavator.

Figure 2:
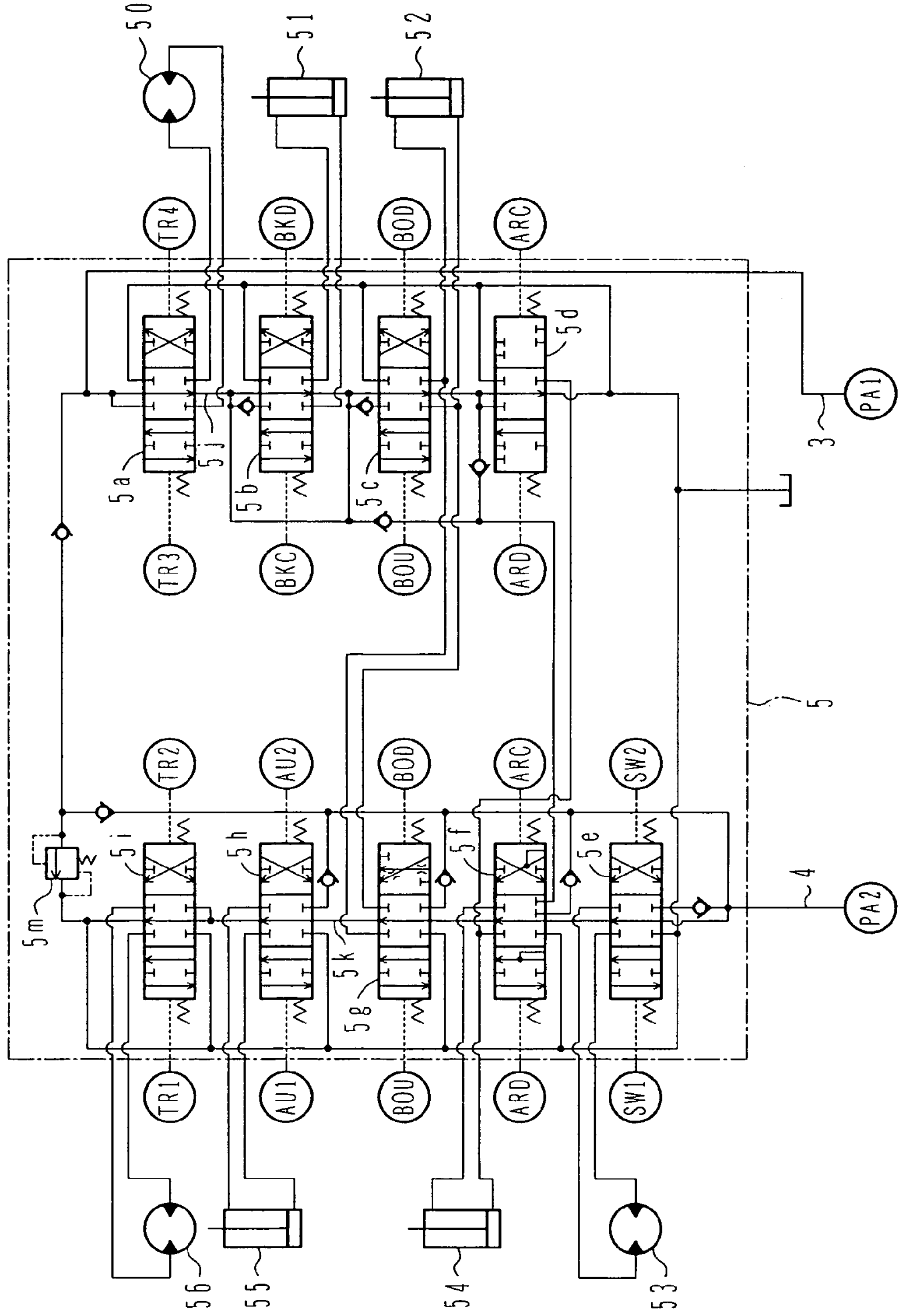
FIG. 2 is a hydraulic circuit diagram of a valve unit and actuators connected to a hydraulic pump shown in FIG. 1.

Referring to FIG. 1, reference numerals 1 and 2 denote variable displacement hydraulic pumps with swash plates. A valve unit 5, shown in FIG. 2, is connected to respective delivery lines 3, 4 of the hydraulic pumps 1, 2, and the hydraulic pumps 1, 2 supply hydraulic fluids to a plurality of actuators 50-56 through the valve unit 5, thereby driving those actuators.

Reference numeral 9 denotes a fixed displacement pilot pump. A pilot relief valve 9*b* for holding delivery pressure of the pilot pump 9 constant is connected to a delivery line 9*a* of the pilot pump 9.

The hydraulic pumps 1, 2 and the pilot pump 9 are connected to an output shaft 11 of the prime mover 10 and are rotated by the prime mover 10.

Details of the valve unit 5 will be described below.

Referring to FIG. 2, the valve unit 5 comprises two valve groups, i.e., flow control valves 5*a*-5*d* and flow control valves 5*e*-5*i*. The flow control valves 5*a*-5*d* are positioned on a center bypass line 5*j* connected to the delivery line 3 of the hydraulic pump 1, and the flow control valves 5*e*-5*i* are positioned on a center bypass line 5*k* connected to the delivery line 4 of the hydraulic pump 2. A main relief valve 5*m* for deciding a maximum level of delivery pressure of the hydraulic pumps 1, 2 is disposed in the delivery lines 3, 4.

The flow control valves 5*a*-5*d* and the flow control valves 5*e*-5*i* are each of the center bypass type, and hydraulic fluids delivered from the hydraulic pumps 1, 2 are supplied through one or more of those flow control valves to corresponding one or more of the actuators 50-56. The actuator 50 is a hydraulic motor for a right track (i.e., a right track motor), the actuator 51 is a hydraulic cylinder for a bucket (i.e., a bucket cylinder), the actuator 52 is a hydraulic cylinder for a boom (i.e., a boom cylinder), the actuator 53 is a hydraulic motor for a swing (i.e., a swing motor), the actuator 54 is a hydraulic cylinder for an arm (i.e., an arm cylinder), the actuator 55 is a backup hydraulic cylinder, and the actuator 56 is a hydraulic motor for a left track (i.e., a left track motor). The flow control valve 5*a* is used for operating the right track, the flow control valve 5*b* is used for operating the bucket, the flow control valve 5*c* is used for operating a first boom, the flow control valve 5*d* is used for operating a second arm, the flow control valve 5*e* is used for operating the swing, the flow control valve 5*f* is used for operating the first arm, the flow control valve 5*g* is used for operating the second boom, the flow control valve 5*h* is for backup, and the flow control valve 5*i* is used for operating the left track. In other words, two flow control valves 5*g*, 5*c* are provided for the boom cylinder 52 and two flow control valves 5*d*, 5*f* are provided for the arm cylinder 54 such that the hydraulic fluids delivered from the hydraulic pumps 1, 2 can be supplied to the boom cylinder 52 and the arm cylinder 54 in a joined manner.

Figure 3:
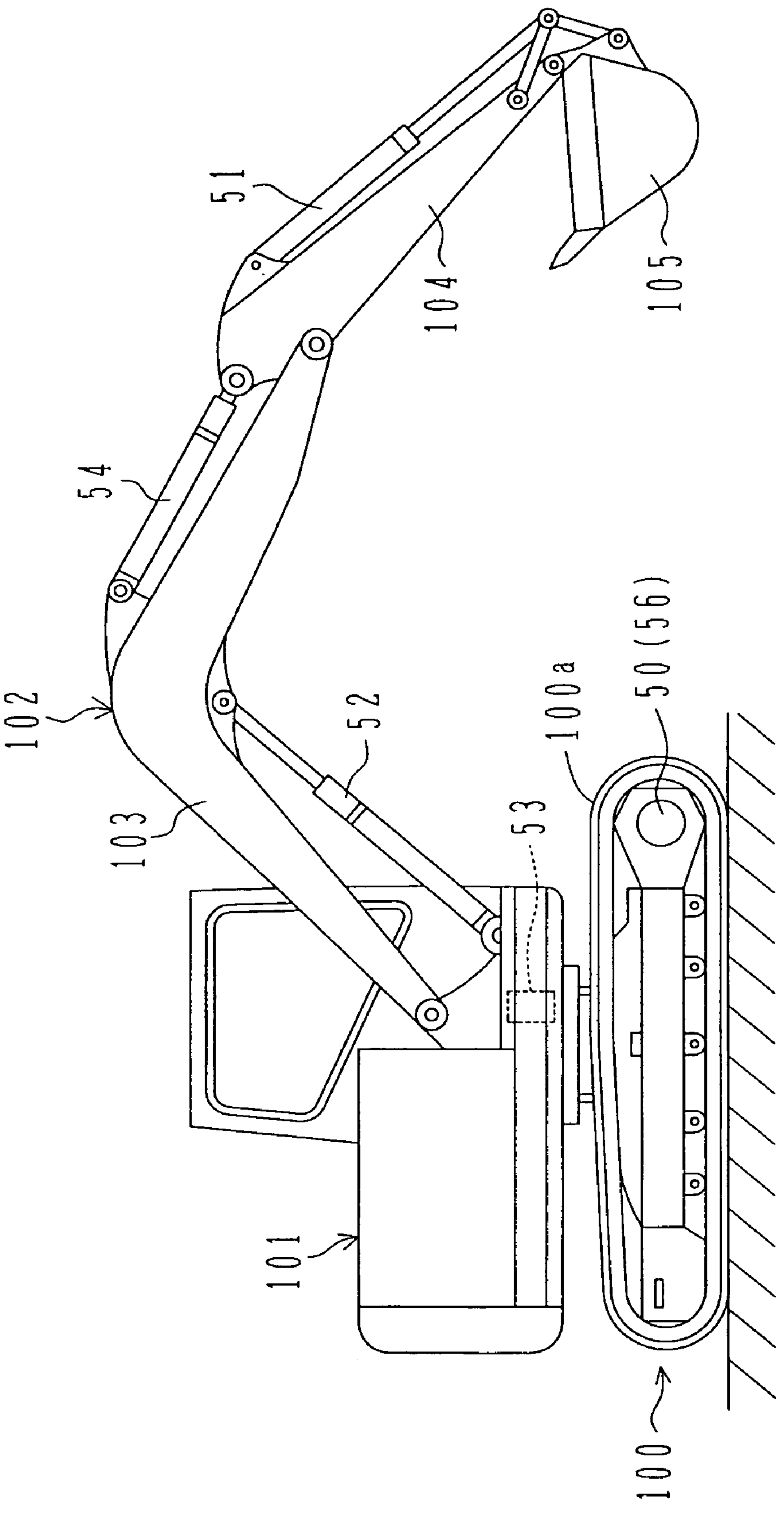
FIG. 3 is a view showing an external appearance of a hydraulic excavator equipped with the prime mover and the hydraulic pump control unit according to the present invention.

FIG. 3 shows an external appearance of a hydraulic excavator equipped with the prime mover and the hydraulic pump control unit according to the present invention. The hydraulic excavator comprises a lower track structure 100, an upper swing body 101, and a front operating mechanism 102. Left and right track motors 50, 56 are mounted to the lower track structure 100, and crawlers 100*a* are rotated by the track motors 50, 56, thereby causing the hydraulic excavator to travel forward or rearward. A swing motor 53 is mounted to the upper swing body 101, and the upper swing body 101 is driven by the swing motor 53 to swing rightward or leftward relative to the lower track structure 100. The front operating mechanism 102 is made up of a boom 103, an arm 104, and a bucket 105. The boom 103 is pivotally rotated by the boom cylinder 52 upward or downward. The arm 104 is operated by the arm cylinder 54 to pivotally rotate toward the dumping (unfolding) side or the crowing (scooping) side. The bucket 105 is operated by the bucket cylinder 51 to pivotally rotate toward the dumping (unfolding) side or the crowing (scooping) side.

Figure 4:
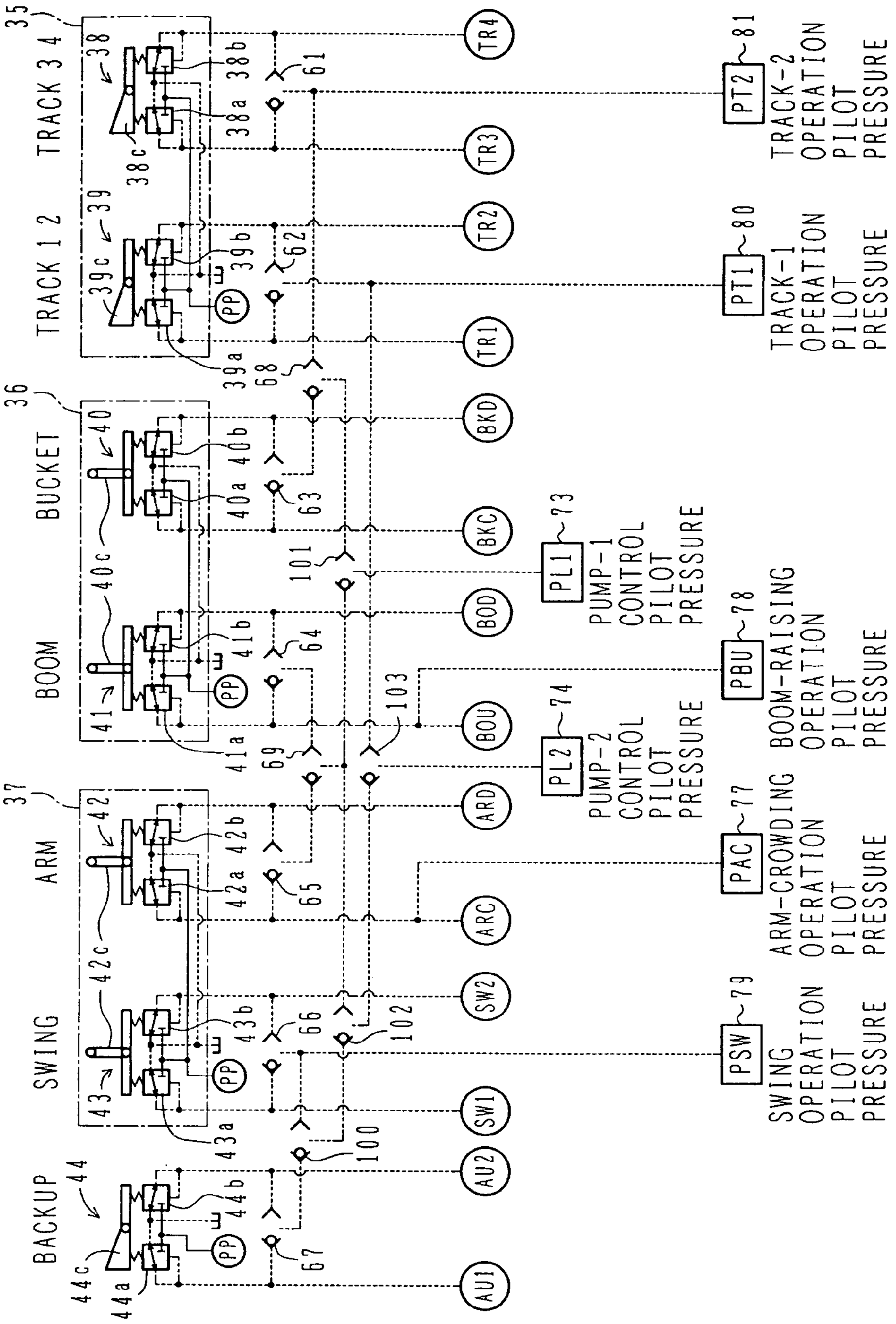
FIG. 4 is a diagram showing an operation pilot system for flow control valves shown in FIG. 2.

FIG. 4 shows an operation pilot system for the flow control valves 5*a*-5*i*.

The flow control valves 5*i*, 5*a* are shifted respectively by operation pilot pressures TR1, TR2 and TR3, TR4 supplied from operation pilot devices 39, 38 of an operating unit 35. The flow control valve 5*b* and the flow control valves 5*c*, 5*g* are shifted respectively by operation pilot pressures BKC, BKD and BOD, BOU supplied from operation pilot devices 40, 41 of an operating unit 36. The flow control valves 5*d*, 5*f* and the flow control valve 5*e* are shifted respectively by operation pilot pressures ARC, ARD and SW1, SW2 supplied from operation pilot devices 42, 43 of an operating unit 37. The flow control valve 5*h* is shifted by operation pilot pressures AU1, AU2 supplied from an operation pilot device 44.

The operation pilot devices 38-44 include respectively pilot valves (pressure reducing valves) 38*a*, 38*b*-44*a*, 44*b* in pair. The operation pilot devices 38, 39 and 44 further include respectively control pedals 38*c*, 39*c* and 44*c*. The operation pilot devices 40, 41 further include a common control lever 40*c*, and the operation pilot devices 42, 43 further include a common control lever 42*c*. When any of the control pedals 38*c*, 39*c* and 44*c* and the control levers 40*c*, 42*c* is manipulated, the pilot valve of the associated operation pilot device is operated depending on the direction in which the pedal or lever is manipulated, and an operation pilot pressure is produced depending on an operation input from the pedal or lever.

Shuttle valves 61-67 are connected to output lines of the respective pilot valves of the operation pilot devices 38-44, and other shuttle valves 68, 69 and 100-103 are further connected to the shuttle valves 61-67 in a hierarchical arrangement. More specifically, maximum one of the operation pilot pressures supplied from the operation pilot devices 38, 40, 41 and 42 is extracted as a control pilot pressure PL1 for the hydraulic pump 1 by the shuttle valves 61, 63, 64, 65, 68, 69 and 101, and maximum one of the operation pilot pressures supplied from the operation pilot devices 39, 41, 42, 43 and 44 is extracted as a control pilot pressure PL2 for the hydraulic pump 2 by the shuttle valves 62, 64, 65, 66, 67, 69, 100, 102 and 103.

Further, the shuttle valve 61 extracts an operation pilot pressure (hereinafter referred to as a "track-2 operation pilot pressure") PT2 supplied from the operation pilot device 38 to drive the track motor 56. The shuttle valve 62 extracts an operation pilot pressure (hereinafter referred to as a "track-1 operation pilot pressure") PT1 supplied from the operation pilot device 39 to drive the track motor 50. The shuttle valve 66 extracts a pilot pressure (hereinafter referred to as a "swing operation pilot pressure") PWS supplied from the operation pilot device 43 to drive the swing motor 53.

The prime mover and the hydraulic pump control unit according to the present invention are provided in association with the hydraulic drive system constructed as described above. Details thereof will be described below.

In FIG. 1, regulators 7, 8 are provided in association with the hydraulic pumps 1, 2, respectively. The regulators 7, 8 control tilting positions of the swash plates 1*a*, 2*a* which serve as displacement varying mechanisms for the hydraulic pumps 1, 2, thereby controlling respective pump delivery rates.

The regulators 7, 8 of the hydraulic pumps 1, 2 comprise respectively tilting actuators 20A, 20B (hereinafter represented by 20 as appropriate), first servo valves 21A, 21B (hereinafter represented by 21 as appropriate) for performing positive tilting control in accordance with the operation pilot pressures supplied from the operation pilot devices 38-44 shown in FIG. 4, and second servo valves 22A, 22B (hereinafter represented by 22 as appropriate) for performing total horsepower control of the hydraulic pumps 1, 2. Those servo valves 21, 22 control the pressure of a hydraulic fluid supplied from the pilot pump 9 and acting on the tilting actuator 20, whereby the tilting positions of the hydraulic pumps 1, 2 are controlled.

Details of the tilting actuator 20 and the first and second servo valves 21, 22 will be described below.

Each tilting actuator 20 comprises a working piston 20*c* having a large-diameter pressure bearing portion 20*a* and a small-diameter pressure bearing portion 20*b* at opposite ends, and pressure bearing chambers 20*d*, 20*e* in which the pressure bearing portions 20*a*, 20*b* are positioned. When the pressures in the pressure bearing chambers 20*d*, 20*e* are equal to each other, the working piston 20*c* is moved to the right as viewed in FIG. 1, whereby the tilting of the swash plate 1*a* or 2*a* is increased and the pump delivery rate is increased correspondingly. When the pressure in the pressure bearing chamber 20*d* in the large-diameter side lowers, the working piston 20*c* is moved to the left as viewed in FIG. 1, whereby the tilting of the swash plate 1*a* or 2*a* is reduced and the pump delivery rate is reduced correspondingly. Further, the pressure bearing chamber 20*d* in the large-diameter side is connected to a delivery line 9*a* of the pilot pump 9 through the first and second servo valves 21, 22, and the pressure bearing chamber 20*e* in the small-diameter side is directly connected to the delivery line 9*a* of the pilot pump 9.

Each first servo valve 21 for the positive tilting control is a valve which is operated by control pressure from a solenoid control valve 30 or 31 and which controls the tilting position of the hydraulic pump 1 or 2. When the control pressure is high, a valve member 21*a* of the first servo valve 21 is moved to the right, as viewed in FIG. 1, such that the pilot pressure from the pilot pump 9 is transmitted to the pressure bearing chamber 20*d* without being reduced, to thereby increase the tilting of the hydraulic pump 1 or 2. As the control pressure lowers, the valve member 21*a* is moved to the left, as viewed in FIG. 1, by a force of a spring 21*b* such that the pilot pressure from the pilot pump 9 is transmitted to the pressure bearing chamber 20*d* after being reduced, to thereby decrease the tilting of the hydraulic pump 1 or 2.

Each second servo valve 22 for the total horsepower control is a valve which is operated by the delivery pressures of the hydraulic pumps 1, 2 and control pressure from a solenoid control valve 32 and which controls absorption torque of the hydraulic pumps 1, 2, thereby performing the total horsepower control.

More specifically, the delivery pressures of the hydraulic pumps 1, 2 and the control pressure from the solenoid control valve 32 are introduced respectively to pressure bearing chambers 22*a*, 22*b* and 22*c* of an operation drive sector. When the sum of hydraulic forces of the delivery pressures of the hydraulic pumps 1, 2 is smaller than a value of the difference between a resilient force of a spring 22*d* and a hydraulic force of the control pressure introduced to the pressure bearing chamber 22*c*, a valve member 22*e* is moved to the right, as viewed in FIG. 1, such that the pilot pressure from the pilot pump 9 is transmitted to the pressure bearing chamber 20*d* without being reduced, to thereby increase the tilting of each hydraulic pump 1, 2. As the sum of hydraulic forces of the delivery pressures of the hydraulic pumps 1, 2 is increased in excess of the above-mentioned difference value, the valve member 22*e* is moved to the left, as viewed in FIG. 1, such that the pilot pressure from the pilot pump 9 is transmitted to the pressure bearing chamber 20*d* after being reduced, to thereby reduce the tilting of each hydraulic pump 1, 2. As a result, the tilting (displacement) of each hydraulic pump 1, 2 is reduced corresponding to a rise of the delivery pressures of the hydraulic pumps 1, 2, and the maximum absorption torque of the hydraulic pumps 1, 2 is controlled so as to not exceed a setting value. At that time, the setting value of the maximum absorption torque is decided by the value of the difference between the resilient force of the spring 22*d* and the hydraulic force of the control pressure introduced to the pressure bearing chamber 22*c*, and the setting value is variable depending on the control pressure from the solenoid control valve 32. When the control pressure from the solenoid control valve 32 is low, the setting value is large, and as the control pressure from the solenoid control valve 32 rises, the setting value is reduced.

Figure 5:
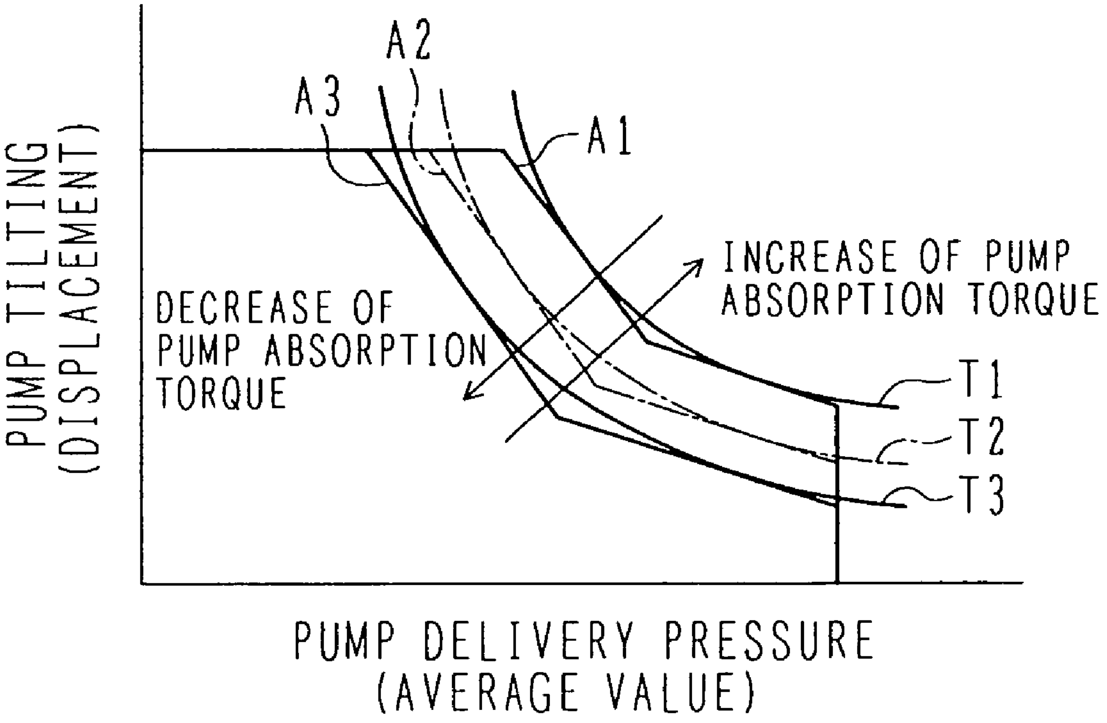
FIG. 5 is a graph showing absorption torque control characteristics of a second servo valve in a pump regulator shown in FIG. 1.

FIG. 5 shows absorption torque control characteristics of each hydraulic pump 1, 2 provided with the second servo valve 22 for the total horsepower control. In FIG. 5, the horizontal axis represents an average value of the delivery pressures of the hydraulic pumps 1, 2 and the vertical axis represents the tilting (displacement) of each hydraulic pump 1, 2. A1, A2 and A3 each represent a setting value of the maximum absorption torque that is decided depending on the difference between the force of the spring 22*d* and the hydraulic force in the pressure bearing chamber 22*c*. As the control pressure from the solenoid control valve 32 rises (i.e., as a drive current reduces), the setting value of the maximum absorption torque decided depending on the difference between the force of the spring 22*d* and the hydraulic force in the pressure bearing chamber 22*c* is changed in sequence of A1, A2 and A3, and the maximum absorption torque of each hydraulic pump 1, 2 is reduced in sequence of T1, T2 and T3. Also, as the control pressure from the solenoid control valve 32 lowers (i.e., as the drive current increases), the setting value of the maximum absorption torque decided depending on the difference between the force of the spring 22*d* and the hydraulic force in the pressure bearing chamber 22*c* is changed in sequence of A3, A2 and A1, and the maximum absorption torque of each hydraulic pump 1, 2 is increased in sequence of T3, T2 and T1.

Returning again to FIG. 1, the solenoid control valves 30, 31 and 32 are proportional pressure reducing valves operated by drive currents SI1, SI2 and SI3, respectively. The solenoid control valves 30, 31 and 32 operate such that when the drive currents SI1, SI2 and SI3 are at a minimum, they output maximum control pressures, and as the drive currents SI1, SI2 and SI3 are increased, they output lower control pressures. The drive currents SI1, SI2 and SI3 are outputted from a controller 70 shown in FIG. 6.

The prime mover 10 is a diesel engine and includes a fuel injector 14. The fuel injector 14 has a governor mechanism and controls the engine revolution speed to be held at a target engine revolution speed NR1 which is given as an output signal from the controller 70 shown in FIG. 6.

As types of the governor mechanism in the fuel injector, there are an electronic governor control unit for controlling the engine revolution speed to be held at the target engine revolution speed by using an electrical signal from the controller, and a mechanical governor controller in which a motor is coupled to a governor lever of a mechanical fuel injection pump and the position of the governor lever is controlled by driving the motor in accordance with a command value from the controller to a preset position where the target engine revolution speed is obtained. Any type of governor control unit can be effectively used as the fuel injector 14 in this embodiment.

Figure 6:
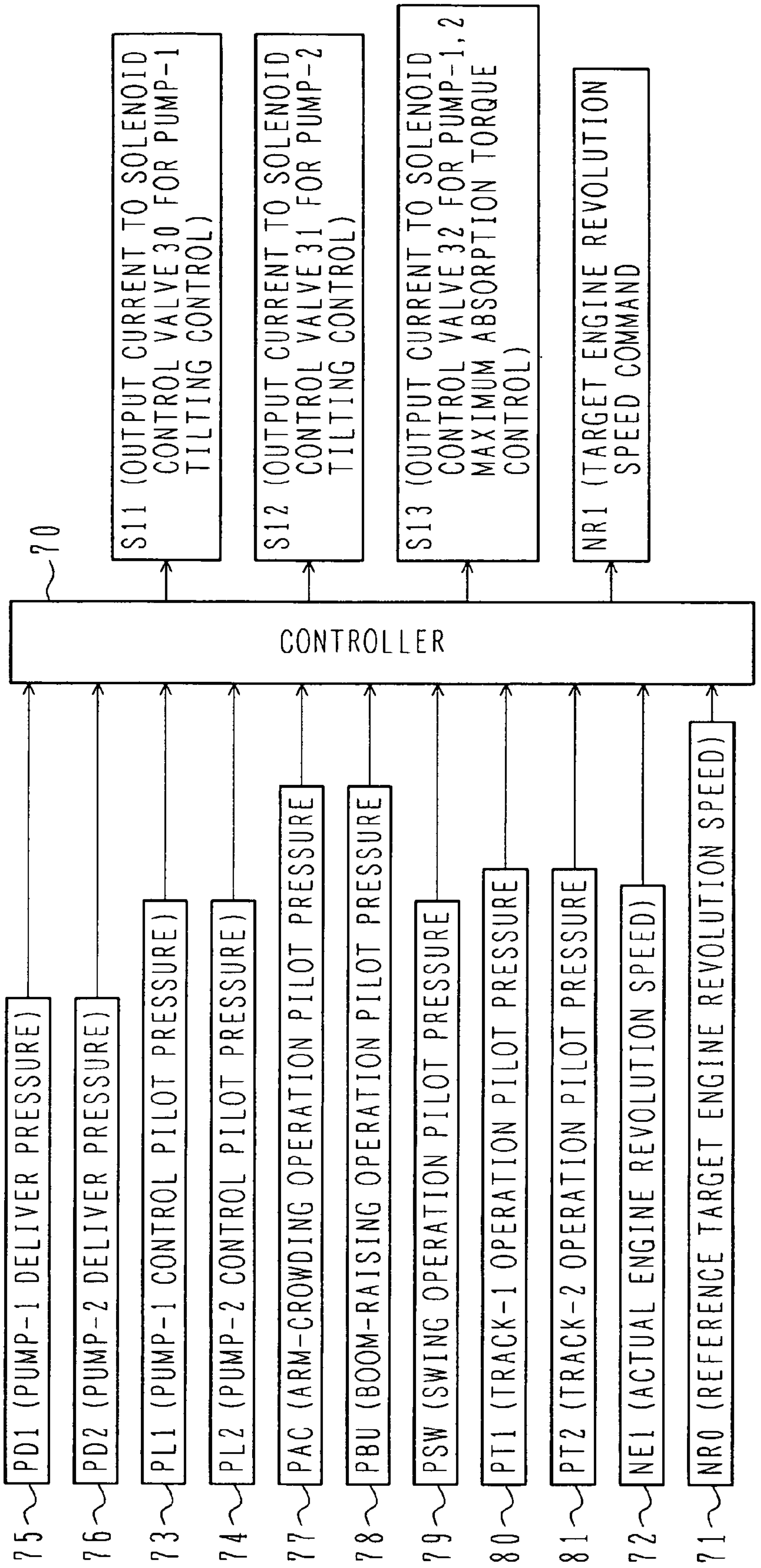
FIG. 6 is a diagram showing input/output relationships of a controller.

The prime mover 10 includes a target engine revolution speed input section 71, shown in FIG. 6, through which an operator manually inputs the target engine revolution speed, and an input signal representing a reference target engine revolution speed NRO is taken into the controller 70. The target engine revolution speed input section 71 may be of the type directly supplying the input signal to the controller 70 with the aid of electrical input means, e.g., a potentiometer, such that the operator is able to select the magnitude of the engine revolution speed as a reference. Generally, the reference target engine revolution speed NRO is set to be high in heavy excavation and low in light work.

Further, as shown in FIG. 1, there are disposed a revolution speed sensor 72 for detecting an actual revolution speed NE1 of the prime mover 10, and pressure sensors 75, 76 for detecting respective delivery pressures PD1, PD2 of the hydraulic pumps 1, 2. In addition, as shown in FIG. 4, there are disposed pressure sensors 73, 74 for detecting respective control pilot pressures PL1, PL2 for the hydraulic pumps 1, 2, a pressure sensor 77 for detecting an arm-crowding operation pilot pressure PAC, a pressure sensor 78 for detecting a boom-raising operation pilot pressure PBU, a pressure sensor 79 for detecting a swing operation pilot pressure PWS, a pressure sensor 80 for detecting a track-1 operation pilot pressure PT1, and a pressure sensor 81 for detecting a track-2 operation pilot pressure PT2.

FIG. 6 shows input/output relationships of all signals for the controller 70. The controller 70 receives various input signals, i.e., a signal of the reference target engine revolution speed NRO from the target engine revolution speed input section 71 described above, a signal of the actual engine revolution speed NE1 from the revolution speed sensor 72, signals of the pump control pilot pressures PL1, PL2 from the pressure sensors 73, 74, signals of the delivery pressures PD1, PD2 of the hydraulic pumps 1, 2 from the pressure sensors 75, 76, as well as signals of the arm-crowding operation pilot pressure PAC, the boom-raising operation pilot pressure PBU, the swing operation pilot pressure PWS, the track-1 operation pilot pressure PT1, and the track-2 operation pilot pressure PT2 from the pressure sensors 77-81. After executing predetermined arithmetic and logical processing, the controller 70 outputs the drive currents SI1, SI2 and SI3 to the solenoid control valves 30, 31 and 32, thereby controlling the tilting position, i.e., the delivery rate, of each hydraulic pump 1, 2, and also outputs the signal of the target engine revolution speed NR1 to the fuel injector 14, thereby controlling the engine revolution speed.

Figure 7:
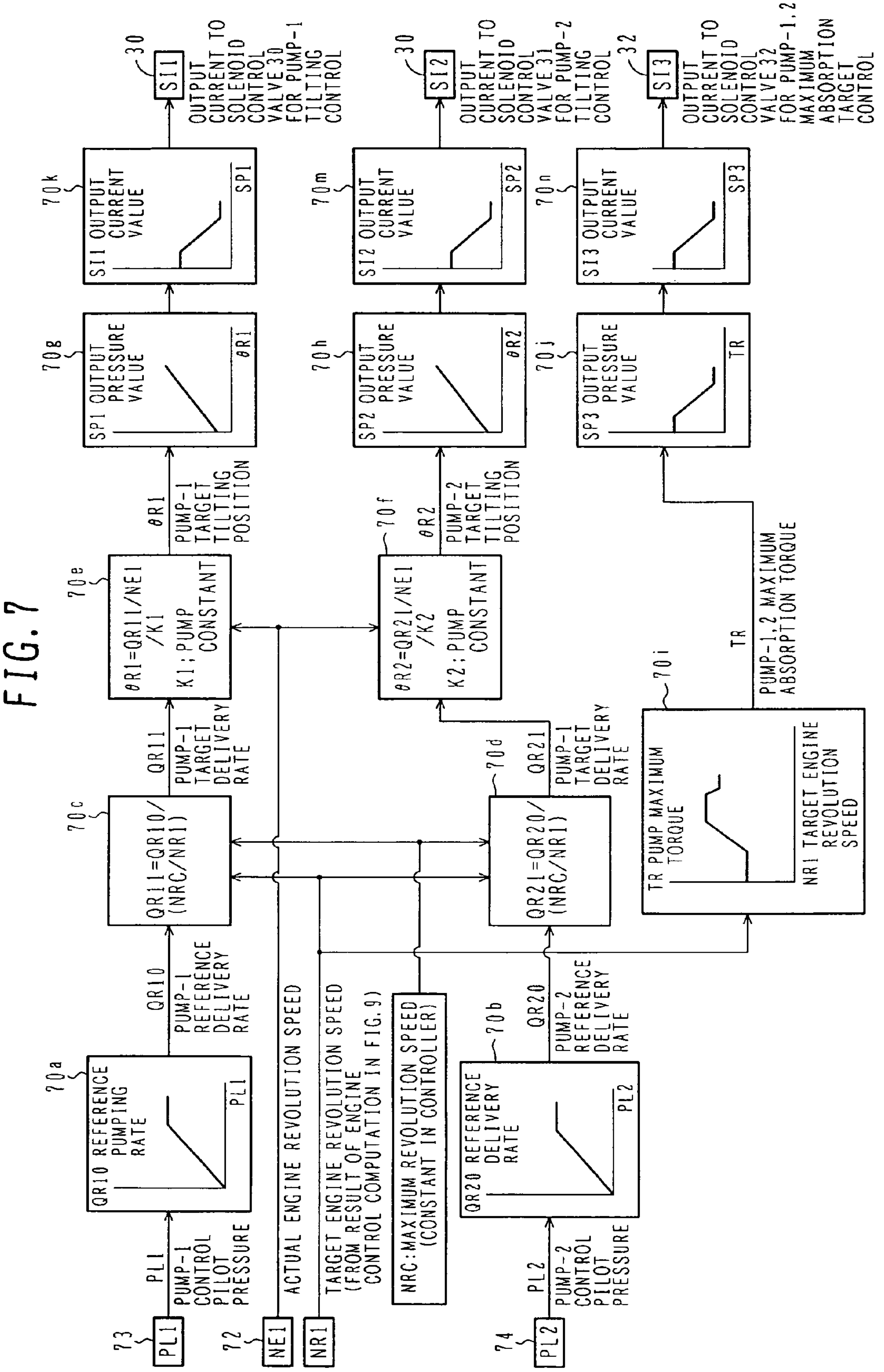
FIG. 7 is a functional block diagram showing processing functions of a pump control section in the controller.

FIG. 7 shows processing functions of the controller 70 relating to the control of the hydraulic pumps 1, 2.

Referring to FIG. 7, the controller 70 has the functions executed by reference pumping rate computing sections 70*a*, 70*b*, target pumping rate computing sections 70*c*, 70*d*, target pump tilting computing sections 70*e*, 70*f*, output pressure computing sections 70*g*, 70*h*, solenoid output current computing sections 70*k*, 70*m*, a pump maximum absorption torque computing section 70*i*, an output pressure computing section 70*j*, and a solenoid output current computing section 70*n*.

The reference pumping rate computing section 70*a* receives the signal of the control pilot pressure PL1 for the hydraulic pump 1 and computes a reference delivery rate QR10 of the hydraulic pump 1 corresponding to the control pilot pressure PL1 at that time by referring to a table stored in a memory with the received signal being a parameter. The reference delivery rate QR10 is used in metering of a reference flow rate for the positive tilting control with respect to the operation inputs from the pilot operating devices 38, 40, 41 and 42. The table stored in the memory sets the relationship between PL1 and QR10 such that the reference delivery rate QR10 is increased as the control pilot pressure PL1 rises.

The target pumping rate computing section 70*c* receives the signal of the target engine revolution speed NR1 (described later) and computes a target delivery rate QR11 of the hydraulic pump 1 by dividing the reference delivery rate QR10 by a ratio (NRC/NR1) of the target engine revolution speed NR1 to a maximum revolution speed NRC that is stored in the memory in advance. This computation is purported to modify the pumping rate depending on the target engine revolution speed inputted in accordance with the operator's intention and to compute the target pump delivery rate corresponding to the target engine revolution speed NR1. In other words, when the target engine revolution speed NR1 is set to be relatively high, this means that a relatively large flow rate is demanded as the pump delivery rate, and therefore the target delivery rate QR11 is also increased correspondingly. When the target engine revolution speed NR1 is set to be relatively low, this means that a relatively small flow rate is demanded as the pump delivery rate, and therefore target delivery rate QR11 is also reduced correspondingly.

The target pump tilting computing section 70*e* receives the signal of the actual engine revolution speed NE1 and computes a target tilting θR1 of the hydraulic pump 1 by dividing the target delivery rate QR11 by the actual engine revolution speed NE1 and further dividing the resulted quotient by a constant K1 that is stored in the memory in advance. This computation is purported to, in consideration of a response delay in engine control relative to change of the target engine revolution speed NR1, to provide the target tilting θR1 through a step of dividing the target delivery rate QR11 by the actual engine revolution speed NE1 so that the target delivery rate QR11 is quickly obtained without a delay in spite of the actual engine revolution speed being not immediately matched with NR1.

The output pressure computing section 70*g* computes an output pressure (control pressure) SP1 for the solenoid control valve 30 at which the target tilting θR1 is obtained in the hydraulic pump 1. The solenoid output current computing section 70*k* computes the drive current SI1 for the solenoid control valve 30 at which the output pressure (control pressure) SP1 is obtained, and then outputs the drive current SI1 to the solenoid control valve 30.

Similarly, in the reference pumping rate computing section 70*b*, the target pumping rate computing section 70*d*, the target pump tilting computing section 70*f*, the output pressure computing section 70*h*, and the solenoid output current computing section 70*m*, the drive current SI2 for the tilting control of the hydraulic pump 2 is computed based on the pump control signal PL2, the target engine revolution speed NR1, and the actual engine revolution speed NE1, and is then outputted to the solenoid control valve 31.

The pump maximum absorption torque computing section 70*i* receives the signal of the target engine revolution speed NR1 and computes maximum absorption torque TR of each hydraulic pump 1, 2 corresponding to the target engine revolution speed NR1 at that time by referring to a table stored in a memory with the received signal being a parameter. The maximum absorption torque TR means target maximum absorption torque of each hydraulic pump 1, 2 which is matched with an output torque characteristic of the engine 10 rotating at the target engine revolution speed NR1.

Figure 8:
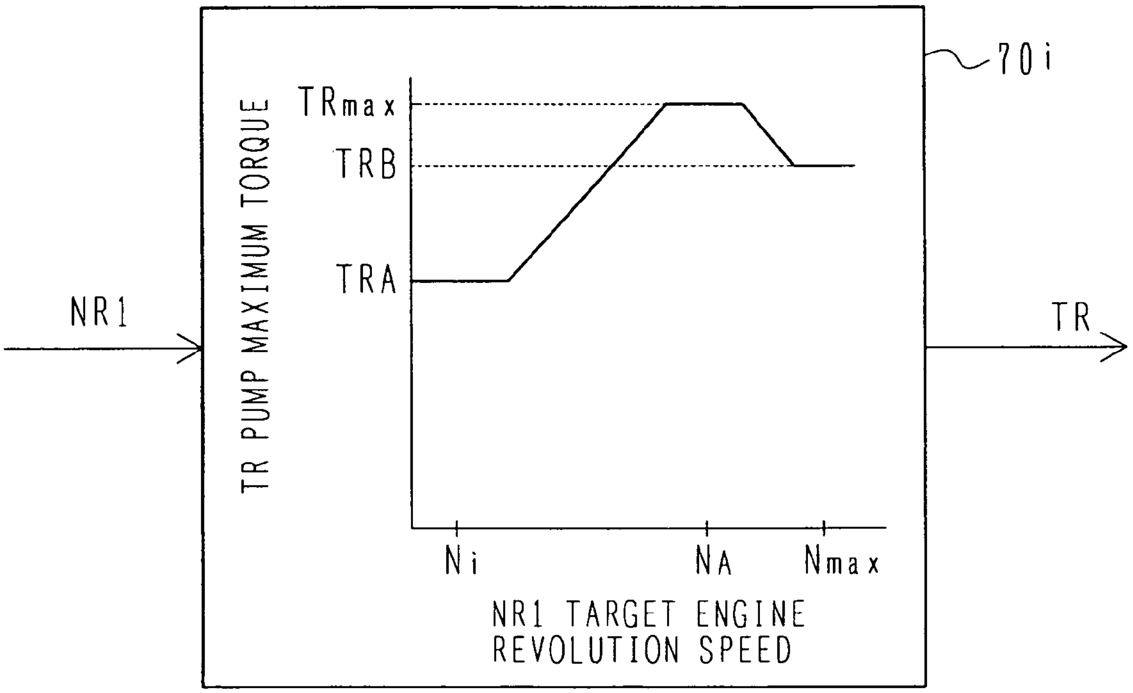
FIG. 8 is a graph showing, in enlarged scale, the relationship between a target engine revolution speed NR1 and maximum absorption torque TR set in a pump maximum absorption torque computing section.

FIG. 8 shows, in enlarged scale, the relationship between the target engine revolution speed NR1 and the maximum absorption torque TR set in the pump maximum absorption torque computing section 70*i*. In the table stored in the memory, the relationship between NR1 and TR is set as follows. When the target engine revolution speed NR1 is in a low revolution speed range near an idle engine revolution speed Ni, the maximum absorption torque TR is set to a minimum TRA. As the target engine revolution speed NR1 increases from the low revolution speed range, the maximum absorption torque TR is also increased, and when the target engine revolution speed NR1 is in a revolution speed range near NA that is slightly lower than a maximum rated revolution speed Nmax, the maximum absorption torque TR takes a maximum TRmax. Finally, when the target engine revolution speed NR1 reaches the maximum rated revolution speed Nmax, the maximum absorption torque TR is set to a value TRB slightly smaller than the maximum TRmax. Here, the term "range of the target engine revolution speed NR1 near NA where the maximum absorption torque TR takes the maximum TRmax" means a revolution speed range where the operation inputs from the operation pilot devices 38-44, e.g., the operation inputs from the control levers 40*c*, 42*c* of the operation pilot devices 40-43, are changed from full stroke to half stroke and the target engine revolution speed is lowered with auto-acceleration control (described later). Also, the relationship in magnitude between the maximum absorption torque TRB at Nmax and the maximum absorption torque TRmax near NA is set such that the maximum delivery rate of the hydraulic pumps 1, 2 is hardly reduced even when the engine revolution speed is lowered with the auto-acceleration control.

Stated another way, in the table stored in the memory, the relationship between NR1 and TR is set such that the operation inputs from the operation pilot devices 40-43, etc. are changed from full stroke to half stroke and the target engine revolution speed is lowered from the maximum rated revolution speed Nmax to near NA with the auto-acceleration control, the maximum absorption torque TR takes the maximum TRmax. Also, the relationship between NR1 and TR is set such that even when the target engine revolution speed is lowered from Nmax to near NA with the auto-acceleration control, whereby the maximum delivery rate of the hydraulic pumps 1, 2 is hardly reduced because the maximum absorption torque TR is increased from TRB to TRmax.

The output pressure computing section 70*j* receives the maximum absorption torque TR and computes an output pressure (control pressure) SP3 for the solenoid control valve 32 at which the selling value of the maximum absorption torque decided depending on the difference between the force of the spring 22*d* and the hydraulic force in the pressure bearing chamber 22*c* of the second servo valve 22 becomes TR. The solenoid output current computing section 70*n* computes the drive current SI3 for the solenoid control valve 32 at which the output pressure (control pressure) SP3 is obtained, and then outputs the drive current SI3 to the solenoid control valve 32.

The solenoid control valve 32 having received the drive current SI3, as described above, outputs the control pressure SP3 corresponding to the drive current SI3, and maximum absorption torque having the same value as the maximum absorption torque TR obtained in the computing section 70*i* is set in the second servo valve 22.

Figure 9:
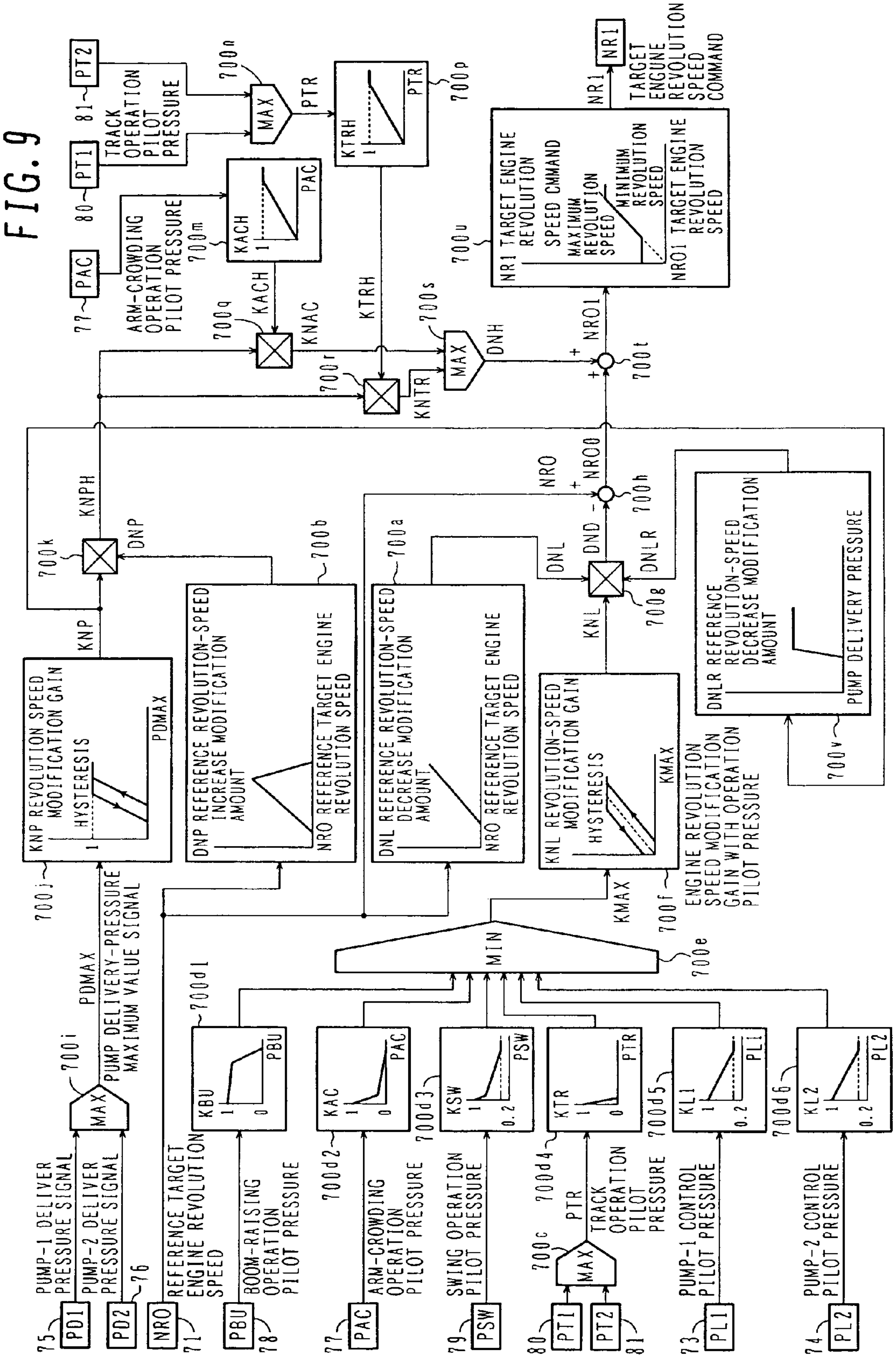
FIG. 9 is a functional block diagram showing processing functions of an engine control section in the controller.

FIG. 9 shows processing functions of the controller 70 relating to the control of the engine 10.

Referring to FIG. 9, the controller 70 comprises a reference revolution-speed decrease modification amount computing section 700*a*, a reference revolution-speed increase modification amount computing section 700*b*, a maximum value selecting section 700*c*, engine-revolution-speed modification gain computing sections 700*d*1-700*d*6, a minimum value selecting section 700*e*, a hysteresis computing section 700*f*, a first engine-revolution-speed modification amount computing section 700*g*, a first reference target engine-revolution-speed modifying section 700*h*, a maximum value selecting section 700*i*, a hysteresis computing section 700*j*, a pump delivery pressure signal modifying section 700*k*, a modification gain computing section 700*m*, a maximum value selecting section 700*n*, a modification gain computing section 700*p*, a second engine-revolution-speed modification amount computing section 700*q*, a third engine-revolution-speed modification amount computing section 700*r*, a maximum value selecting section 700*s*, a second reference target engine-revolution-speed modifying section 700*t*, a limiter computing section 700*u*, and a reference revolution-speed decrease modification amount computing section 700*v*.

The reference revolution-speed decrease modification amount computing section 700*a* receives the signal of the reference target engine revolution speed NRO from the target engine revolution speed input section 71 and computes a reference revolution-speed decrease modification amount DNL corresponding to NRO at that time by referring to a table stored in a memory with the received signal being a parameter. The DNL serves as a reference width in modification of the engine revolution speed based on change of the input from the control levers or pedals of the operation pilot devices 38-44 (i.e., change of the operation pilot pressure). Because the revolution speed modification amount is desired to be smaller as the target engine revolution speed lowers, the relationship between NRO and DNL is set in the table stored in the memory such that the reference revolution-speed decrease modification amount DNL is reduced as the target reference engine revolution speed NRO lowers.

Similarly to the computing section 700*a*, the reference revolution-speed increase modification amount computing section 700*b* receives the signal of the reference target engine revolution speed NRO and computes a reference revolution-speed increase modification amount DNP corresponding to NRO at that time by referring to a table stored in a memory with the received signal being a parameter. The DNP serves as a reference width in modification of the engine revolution speed based on input change of the pump delivery pressure. Because the revolution speed modification amount is desired to be smaller as the target engine revolution speed lowers, the relationship between NRO and DNP is set in the table stored in the memory such that the reference revolution-speed increase modification amount DNP is reduced as the target reference engine revolution speed NRO lowers. However, because the engine revolution speed cannot be raised beyond a specific maximum revolution speed, the increase modification amount DNP is reduced near a maximum value of the target reference engine revolution speed NRO.

The maximum-value selecting section 700*c* selects higher one of the track-1 operation pilot pressure PT1 and the track-2 operation pilot pressure PT2 as a track operation pilot pressure PTR.

The engine-revolution-speed modification gain computing sections 700*d*1-700*d*6 receive the respective signals of the boom-raising operation pilot pressure PBU, the arm-crowding operation pilot pressure PAC, the swing operation pilot pressure PWS, the track operation pilot pressure PTR, and the pump control pilot pressures PL1, PL2, and compute engine revolution speed modification gains KBU, KAC, KSW, KTR, KL1 and KL2 corresponding to those operation pilot pressures at that time by referring to respective tables stored in memories with the received signals being parameters.

The computing sections 700*d*1-700*d*4 are each intended to previously set change of the engine revolution speed with respect to change of the input from the control lever or pedal (i.e., change of the operation pilot pressure) for each actuator operated, for the purpose of facilitating the operation. The modification gains are set as follows.

The boom-raising operation is usually performed in a small stroke range such as when positioning is made in load lifting work and leveling work. Therefore, the gain is set so as to lower the engine revolution speed in the small stroke range and to have a small gradient.

When the arm-crowding operation is performed in excavation, the control lever is operated through full stroke in many cases. Therefore, the gain is set to have a small gradient near full lever stroke so that fluctuations of the revolution speed near the full lever stroke are reduced.

In the swing operation, the gain is set to have a small gradient in an intermediate revolution range so that fluctuations in the intermediate revolution range are reduced.

In the track operation, a strong force is required even in the small stroke range, and therefore the engine revolution speed is set to a high level from a point just in the small stroke range.

The engine revolution speed at the full lever stroke is also set to be changeable for each actuator. For example, in the boom-raising and arm-crowding operations, because a large flow rate is required, the engine revolution speed is set to a high level. In the other operations, the engine revolution speed is set to a relatively low level. In the track operation, the engine revolution speed is set to a high level to raise the excavator speed.

Corresponding to the above-described conditions, the relationships between the operation pilot pressure and the modification gains KBU, KAC, KSW and KTR are set in the respective tables stored in the memories of the computing sections 700$d$1-700$d$4.

Also, the pump control pilot pressures PL1, PL2 inputted from the computing sections 700$d$5, 700$d$6 are each maximum one of the related operation pilot pressures, and the engine revolution speed modification gains KL1, KL2 are computed by using the pump control pilot pressures PL1, PL2 as representatives of all the related operation pilot pressures.

Generally, the engine revolution speed is desired to be higher as the operation pilot pressure (i.e., the operation input from the control lever or pedal) rises. Corresponding to such a demand, the relationships between the pump control pilot pressures PL1, PL2 and the modification gains KL1, KL2 are set in respective tables stored in memories of the computing sections 700$d$5, 700$d$6. Further, the modification gains KL1, KL2 near maximum levels of the pump control pilot pressures PL1, PL2 are set to be somewhat higher than the other modification gains in order that the minimum value selecting section 700$e$ selects any of the modification gains computed in the computing sections 700$d$1-700$d$4 with priority.

The minimum value selecting section 700$e$ selects a minimum value of the modification gains computed in the computing sections 700$d$1-700$d$6 and outputs it as KMAX. When the other operation than the boom-raising, arm-crowding, swing and track operations is performed, the engine revolution speed modification gains KL1, KL2 are computed by using the pump control pilot pressures PL1, PL2 as representatives, and smaller one of them is selected as KMAX.

The hysteresis computing section 700$f$ gives a hysteresis characteristic to KMAX and outputs the result as an engine revolution speed modification gain KNL based on the operation pilot pressure.

The reference revolution-speed decrease modification amount computing section 700$v$ refers to a table stored in a memory with a parameter given as a revolution speed modification gain KNP (described later) based on the pump delivery pressure, i.e., as a revolution speed modification gain based on the pump-delivery-pressure maximum value signal PDMAX obtained through the maximum value selecting section 700$i$, and then computes a reference revolution-speed decrease modification amount (modification coefficient) DNLR corresponding to KNP at that time.

Figure 10:
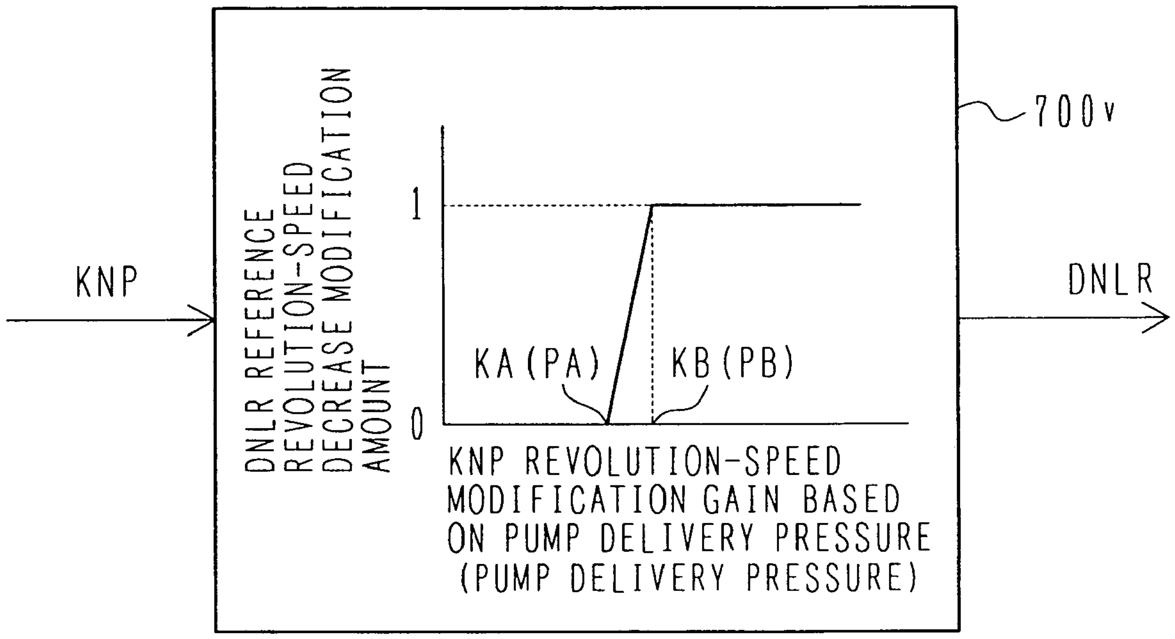
FIG. 10 is a graph showing, in enlarged scale, the relationship between a revolution speed modification gain KNP based on pump delivery pressure and a reference revolution-speed decrease modification amount DNLR set in a reference revolution-speed decrease modification amount computing section.

FIG. 10 shows, in enlarged scale, the relationship between the revolution speed modification gain KNP based on the pump delivery pressure and the reference revolution-speed decrease modification amount DNLR set in the reference revolution-speed decrease modification amount computing section 700$v$. The horizontal axis represents the revolution speed modification gain KNP along with a value of pump delivery pressure after conversion (i.e., the pump delivery pressure). The revolution speed modification gain KNP and the reference revolution-speed decrease modification amount DNLR are each a modification coefficient between 0 and 1. In the table stored in the memory, the relationship between the revolution speed modification gain KNP (pump delivery pressure) and the reference revolution-speed decrease modification amount DNLR is set as follows. When the revolution speed modification gain KNP is smaller than a preset first value KA (i.e., when the pump delivery pressure is smaller than a preset first value PA), the modification coefficient DNLR is set to 0. When the revolution speed modification gain KNP becomes larger than the first value KA (i.e., when the pump delivery pressure becomes larger than the first value PA), the modification coefficient DNLR is increased from 0 correspondingly. When the revolution speed modification gain KNP reaches a preset second value KB (i.e., when the pump delivery pressure reaches a preset second value PB), the modification coefficient DNLR is set to 1.

A range of the revolution speed modification gain KNP from 0 to KA (i.e., a range of the pump delivery pressure from 0 to PA) corresponds to a region Y (described later) where the load pressure of each hydraulic pump 1, 2 is lower than that in a control region X (described later) of pump absorption torque control means. A range of the revolution speed modification gain KNP beyond KA (i.e., a range of the pump delivery pressure beyond PA) corresponds to the control region X (described later) of the pump absorption torque control means.

The operation-pilot-pressure-based engine-revolution-speed modification amount computing section 700$g$ multiplies the engine revolution speed modification gain KNL by the reference revolution-speed decrease modification amount DNL and further the reference revolution-speed decrease modification amount DNLR, to thereby not only compute an engine revolution-speed decrease modification amount DND based on the input change of the operation pilot pressure (i.e., a value resulting from multiplying the engine revolution speed modification gain KNL by the reference revolution-speed decrease modification amount DNL), but also to modify the engine revolution-speed decrease modification amount DND in accordance with the reference revolution-speed decrease modification amount DNLR. In other words, the computing section 700$g$ computes the engine revolution-speed decrease modification amount DND based on the input change of the operation pilot pressure, which is modified in accordance with the reference revolution-speed decrease modification amount DNLR.

The first reference target engine-revolution-speed modifying section 700$h$ subtracts the engine revolution-speed decrease modification amount DND from the reference target engine revolution speed NRO to obtain a target revolution speed NROO. This target revolution speed NROO represents a target engine revolution speed after the modification based on the operation pilot pressure.

The maximum value selecting section 700$i$ receives the signals of the delivery pressures PD1, PD2 of the hydraulic pumps 1, 2 and selects higher one of the delivery pressures PD1, PD2 as the pump-delivery-pressure maximum value signal PDMAX.

The hysteresis computing section 700$j$ gives a hysteresis characteristic to the pump-delivery-pressure maximum value signal PDMAX and outputs the result as a revolution speed modification gain KNP based on the pump delivery pressure.

The pump delivery pressure signal modifying section 700$k$ multiplies the revolution speed modification gain KNP by the reference revolution-speed increase modification amount DNP to obtain an engine revolution basic modification amount KNPH based on the pump delivery pressure.

The modification gain computing section 700$m$ receives the signal of the arm-crowding operation pilot pressure PAC and computes an engine revolution speed modification gain KACH corresponding to the operation pilot pressure PAC at that time by referring to a table stored in a memory with the received signal being a parameter. As the arm-crowding operation input increases, a larger flow rate is required. Correspondingly, the relationship between PAC and KACH is set in the table stored in the memory such that the modification gain KACH is increased as the arm-crowding operation pilot pressure PAC rises.

The maximum value selecting section 700$n$ selects, similarly to the maximum value selecting section 700$c$, higher one of the track-1 operation pilot pressure PT1 and the track-2 operation pilot pressure PT2 as a track operation pilot pressure PTR.

The modification gain computing section 700*p* receives the signal of the track operation pilot pressure PTR and computes an engine revolution speed modification gain KTRH corresponding to the track operation pilot pressure PTR at that time by referring to a table stored in a memory with the received signal being a parameter. Like the above case, as the track operation input increases, a larger flow rate is required. Correspondingly, the relationship between PTR and KTRH is set in the table stored in the memory such that the modification gain KTRH is increased as the track operation pilot pressure PTR rises.

The first and second pump-delivery-pressure-based engine-revolution-speed modification amount computing sections 700*q*, 700*r* multiply the engine revolution basic modification amount KNPH based on the pump delivery pressure by the modification gains KACH, KTRH, respectively, to obtain engine revolution speed modification amounts KNAC, KNTR.

The maximum value selecting section 700*s* selects larger one of the engine revolution-speed modification amounts KNAC, KNTR as a modification amount DNH. This modification amount DNH represents the engine revolution-speed increase modification amount based on both the pump delivery pressure and the input change of the operation pilot pressure.

Here, multiplying the engine revolution basic modification amount KNPH by the modification gains KACH, KTRH to obtain the engine revolution speed modification amounts KNAC, KNTR in the computing sections 700*q*, 700*r*, respectively, means that the engine revolution speed increase modification based on the pump delivery pressure is performed only during the arm-crowding operation and the track operation. As a result, the engine revolution speed can be raised in spite of a rise of the pump delivery pressure only during the arm-crowding operation and the track operation in which it is desired to raise the engine revolution speed when the actuator load is increased.

The second reference target engine-revolution-speed modifying section 700*t* adds the engine revolution-speed increase modification amount DNH to the above-mentioned target revolution speed NROO, to thereby obtain a target engine revolution speed NRO1.

The limiter computing sections 700*u* gives a limiter, which limits a maximum revolution speed and a minimum revolution speed specific to the engine, to the target engine revolution speed NRO1, thereby computing the target engine revolution speed NR1 that is sent to the fuel injector 14 (see FIG. 1). The target engine revolution speed NR1 is also sent to the pump maximum absorption torque computing section 70*i* (see FIG. 7) in the controller 70, which is related to the control of the hydraulic pumps 1, 2.

In the foregoing description, the target revolution speed input section 71 constitutes input means for commanding the reference target revolution speed of the prime mover 10 (i.e., the reference target engine revolution speed NRO). The fuel injector 14 constitutes revolution speed control means for controlling the revolution speed of the prime mover 10, and the operation pilot devices 38-44 constitute operation command means for commanding the operations of the plurality of actuators 50-56.

Also, the various functions of the controller 70, shown in FIG. 9, constitutes target revolution speed setting means for setting the target revolution speed of the revolution speed control means (i.e., the target engine revolution speed NR1) based on the reference target revolution speed.

The pressure sensors 73, 74 and 77-81 constitute operation detecting means for detecting command inputs from the operation command means (i.e., the boom-raising operation pilot pressure PBU, the arm-crowding operation pilot pressure PAC, the swing operation pilot pressure PWS, the track operation pilot pressures PT1, PT2, and the pump control pilot pressures PL1, PL2).

The pressure sensors 75, 76 constitute load pressure detecting means for detecting the load pressures of the hydraulic pumps 1, 2 (i.e., the pump delivery pressures PD1, PD2).

The functions of the engine-revolution-speed modification gain computing sections 700*d*1-700*d*6, the minimum value selecting section 700*e*, the hysteresis computing section 700*f*, the engine-revolution-speed modification amount computing section 700*g*, and the first reference target engine-revolution-speed modifying section 700*h* of the controller 70, shown in FIG. 9, constitute a first modifying section (auto-acceleration control means) for changing the target revolution speed depending on the command inputs from the operation command means (i.e., the boom-raising operation pilot pressure PBU, the arm-crowding operation pilot pressure PAC, the swing operation pilot pressure PWS, the track operation pilot pressures PT1, PT2, and the pump control pilot pressures PL1, PL2) which are detected by the operation detecting means. Thus, auto-acceleration control for increasing and decreasing the engine revolution speed depending on the command inputs from the operation command means can be performed by changing, in the first modifying section, the target revolution speed depending on the command inputs from the operation command means, which are detected by the operation detecting means.

The functions of the reference revolution-speed decrease modification amount computing section 700*v* and the first engine-revolution-speed modification amount computing section 700*g* of the controller 70, shown in FIG. 9, constitute a second modifying section for modifying the change of the target revolution speed (i.e., the engine revolution speed modification gain KNL), which is given by the first modifying section, depending on the load pressure detected by the load pressure detecting means.

The second modifying section (i.e., the reference revolution-speed decrease modification amount computing section 700*v* and the first engine-revolution-speed modification amount computing section 700*g*) modifies the change of the target revolution speed (i.e., the engine revolution speed modification gain KNL), which is given by the first modifying section, to be a minimum when the load pressure (i.e., the pump delivery pressure PD1, PD2) detected by the load pressure detecting means is lower than a certain value PA (see FIG. 10).

Also, the second servo valve 22 constitutes pump absorption torque control means for making control to reduce the displacement of the hydraulic pump 1, 2 corresponding to a rise of the load pressure of the hydraulic pump 1, 2 such that the maximum absorption torque of the hydraulic pump 1, 2 does not exceed the setting value.

The second modifying section (i.e., the reference revolution-speed decrease modification amount computing section 700*v* and the first engine-revolution-speed modification amount computing section 700*g*) modifies the change of the target revolution speed, which is given by the first modifying section, to be a minimum in the region Y (described later) where the load pressure of the hydraulic pump 1, 2 is lower than that in the control region X (described later) of the pump absorption torque control means.

Also, the second servo valve 22 constitutes pump absorption torque control means for, when the load pressure of the hydraulic pump 1, 2 becomes higher than a first value PC (described later), making control to reduce the displacement of the hydraulic pump 1, 2 corresponding to a rise of the load pressure of the hydraulic pump 1, 2 such that the maximum absorption torque of the hydraulic pump 1, 2 does not exceed the setting value.

The second modifying section (i.e., the reference revolution-speed decrease modification amount computing section 700*v* and the first engine-revolution-speed modification amount computing section 700*g*) modifies the change of the target revolution speed, which is given by the first modifying section, to be a minimum when the load pressure detected by the load pressure detecting means is lower than a second value PA (see FIG. 10), the second value PA being set to near the first value PC.

The second modifying section (i.e., the reference revolution-speed decrease modification amount computing section 700*v* and the first engine-revolution-speed modification amount computing section 700*g*) computes a revolution speed modification value (i.e., the reference revolution speed decrease modification amount DNLR) which is changed depending on the load pressure detected by the load pressure detecting means, thereby modifying the change of the target revolution speed, which is given by the first modifying section, in accordance with the revolution speed modification value DNLR.

The first modifying section includes first means (i.e., the engine-revolution-speed modification gain computing sections 700*d*1-700*d*6, the minimum value selecting section 700*e*, and the hysteresis computing section 700*f*) for computing a first revolution speed modification value (i.e., the engine revolution speed modification gain KNL) corresponding to the operation inputs from the operation command means, which are detected by the operation detecting means. The second modifying section includes second means (i.e., the reference revolution-speed decrease modification amount computing section 700*v*) for computing a second revolution speed modification value (i.e., the reference revolution speed decrease modification amount DNLR) corresponding to the magnitude of the load pressure detected by the load detecting means, and third means (i.e., the first engine-revolution-speed modification amount computing section 700*g*) for executing computation based on the first revolution speed modification value and the second revolution speed modification value, to thereby obtain a third revolution speed modification value (i.e., the engine revolution speed decrease modification amount DND). The first and second modifying sections further include fourth means (i.e., the first reference target engine-revolution-speed modifying section 700*h*) for executing computation based on the third revolution speed modification value and the reference target revolution speed NRO, to thereby obtain the target revolution speed.

The first means is means (i.e., the engine-revolution-speed modification gain computing sections 700*d*1-700*d*6, the minimum value selecting section 700*e*, and the hysteresis computing section 700*f*) for computing, as the first revolution speed modification value, a first modification revolution speed (i.e., the engine revolution speed modification gain KNL). The second means is means (i.e., the reference revolution-speed decrease modification amount computing section 700*v*) for computing, as the second revolution speed modification value, a modification coefficient (i.e., the reference revolution speed decrease modification amount DNLR). The third means is means (i.e., the first engine-revolution-speed modification amount computing section 700*g*) for multiplying the first modification revolution speed by the modification coefficient to obtain, as the third revolution speed modification value, a second modification revolution speed (i.e., the engine revolution speed decrease modification amount DND). The fourth means is means (i.e., the first reference target engine-revolution-speed modifying section 700*h*) for subtracting the second modification revolution speed (i.e., the engine revolution speed decrease modification amount DND) from the reference target revolution speed NRO.

The second means (i.e., the reference revolution-speed decrease modification amount computing section 700*v*) computes the modification coefficient (i.e., the reference revolution speed decrease modification amount DNLR) such that the modification coefficient is 0 when the magnitude of the load pressure is smaller than the preset first value PA, it is increased from 0 when the magnitude of the load pressure exceeds the first value PA, and it becomes 1 when the magnitude of the load pressure reaches the preset second value PB.

Further, the functions of the pump maximum absorption torque computing section 70*i*, the output pressure computing section 70*j* and the solenoid output current computing section 70*h* of the controller 70, shown in FIG. 7, as well as the solenoid control valve 32 and the pressure bearing chamber 22*c* of the second servo valve 22 constitute maximum absorption torque modifying means for modifying the setting value to increase the maximum absorption torque of the hydraulic pump 1, 2 when the target revolution speed is modified to be lower than the preset rated revolution speed (i.e., the maximum rated revolution speed Nmax) by the first modifying section (i.e., the engine-revolution-speed modification gain computing sections 700*d*1-700*d*6, the minimum value selecting section 700*e*, the hysteresis computing section 700*f*, the engine-revolution-speed modification amount computing section 700*g*, and the first reference target engine-revolution-speed modifying section 700*h*).

The features of the operation of this embodiment thus constituted will be described below with reference to FIGS. 11-16.

Figure 11:
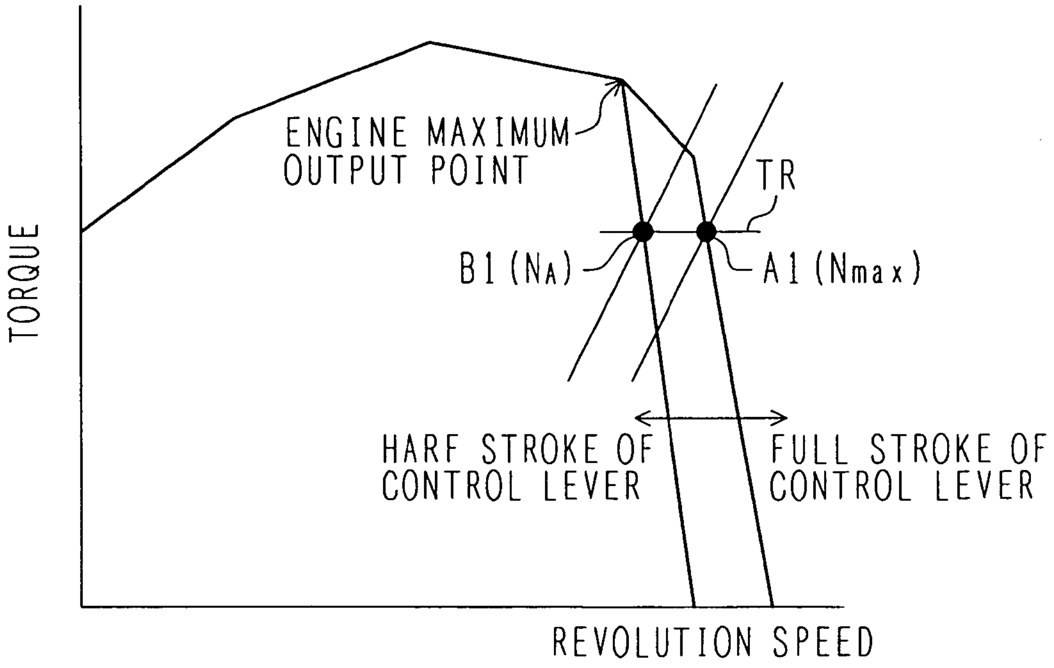
FIG. 11 is a graph showing, as a comparative example, change of a matching point with maximum torque when a control lever is operated in a system comprising the known auto-acceleration system.
Figure 12:
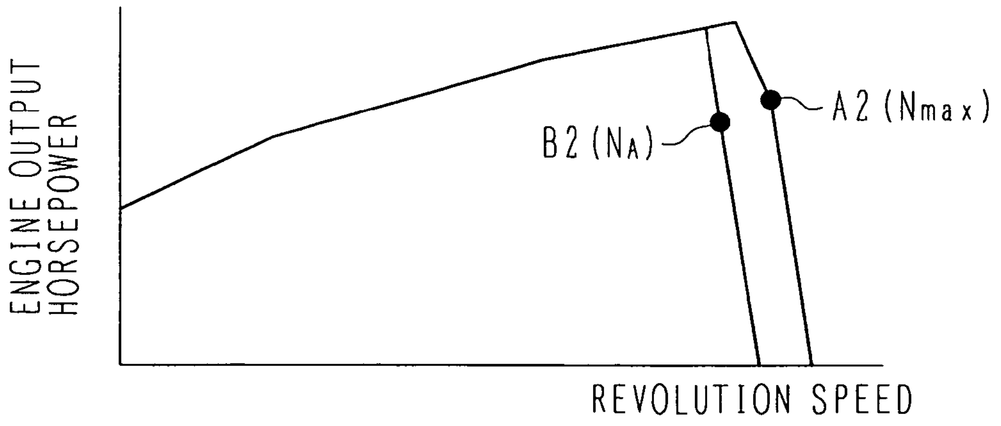
FIG. 12 is a graph showing, as a comparative example, change of a matching point with maximum output horsepower when the control lever is operated in the system comprising the known auto-acceleration system.
Figure 13:
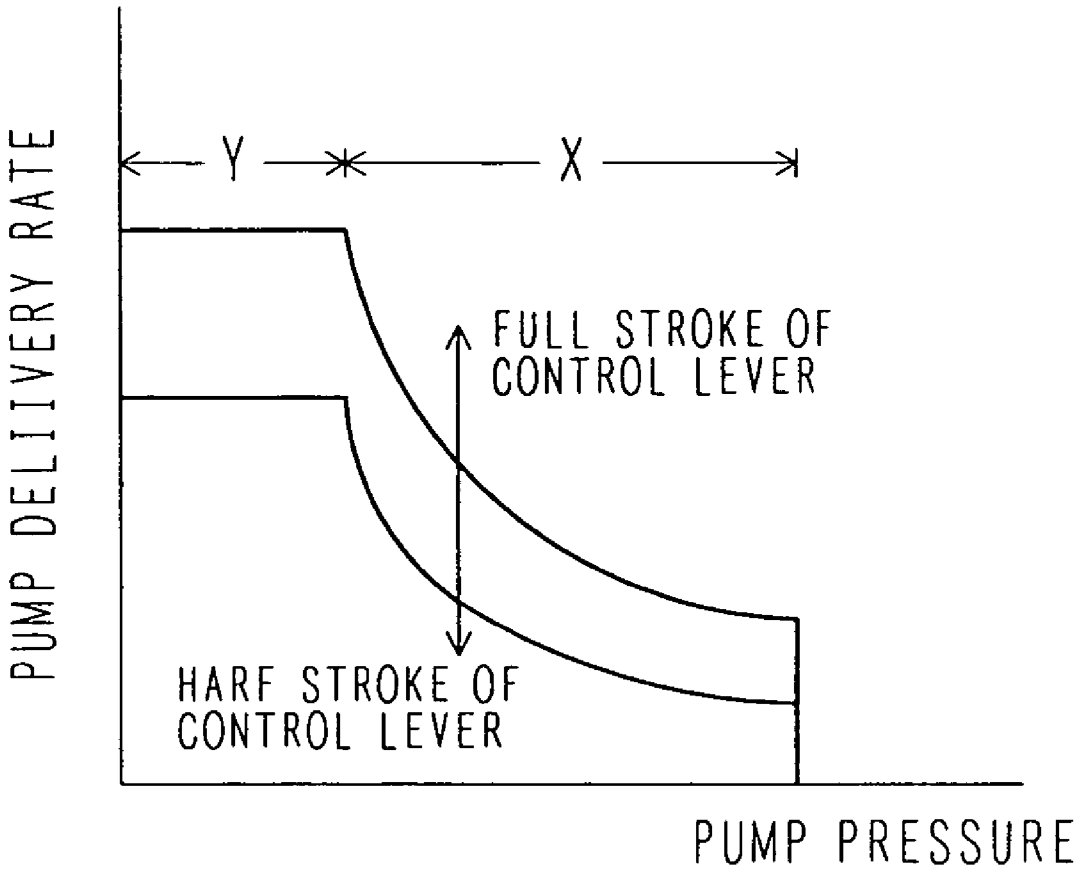
FIG. 13 is a graph showing, as a comparative example, change of a pumping rate characteristic including pump absorption horsepower when the control lever is operated in the system comprising the known auto-acceleration system.
Figure 14:
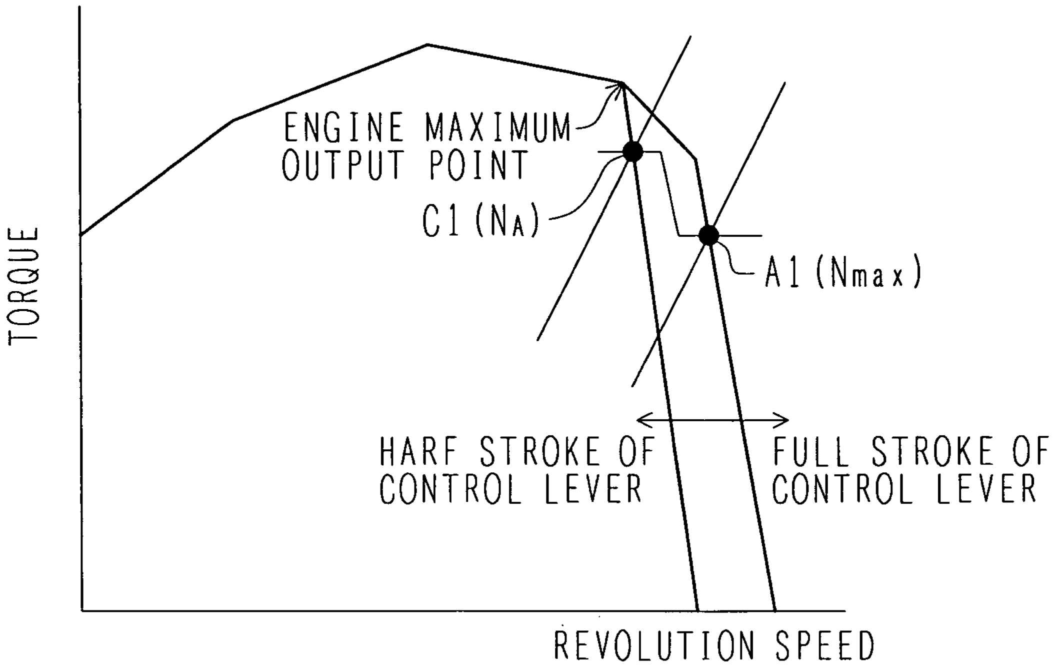
FIG. 14 is a graph showing change of a matching point with maximum torque when a control lever is operated in a system comprising the auto-acceleration system according to one embodiment of the present invention.
Figure 15:
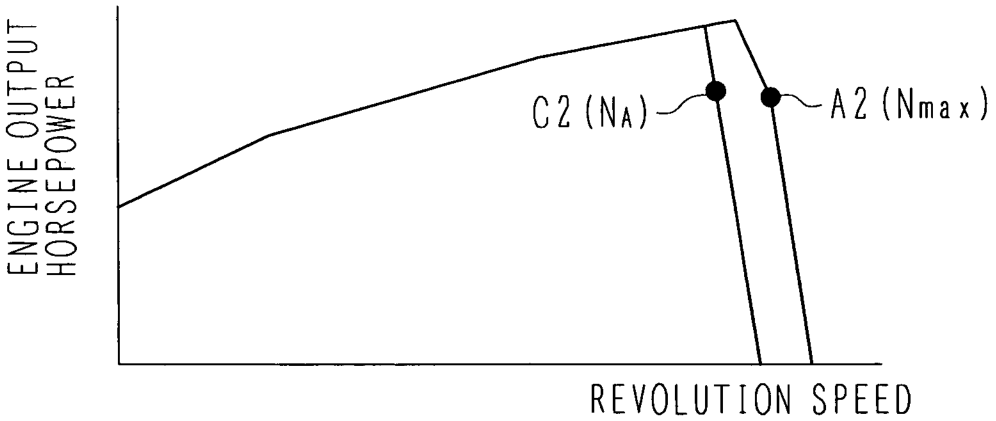
FIG. 15 is a graph showing change of a matching point with maximum output horsepower when the control lever is operated in the system comprising the auto-acceleration system according to one embodiment of the present invention.
Figure 16:
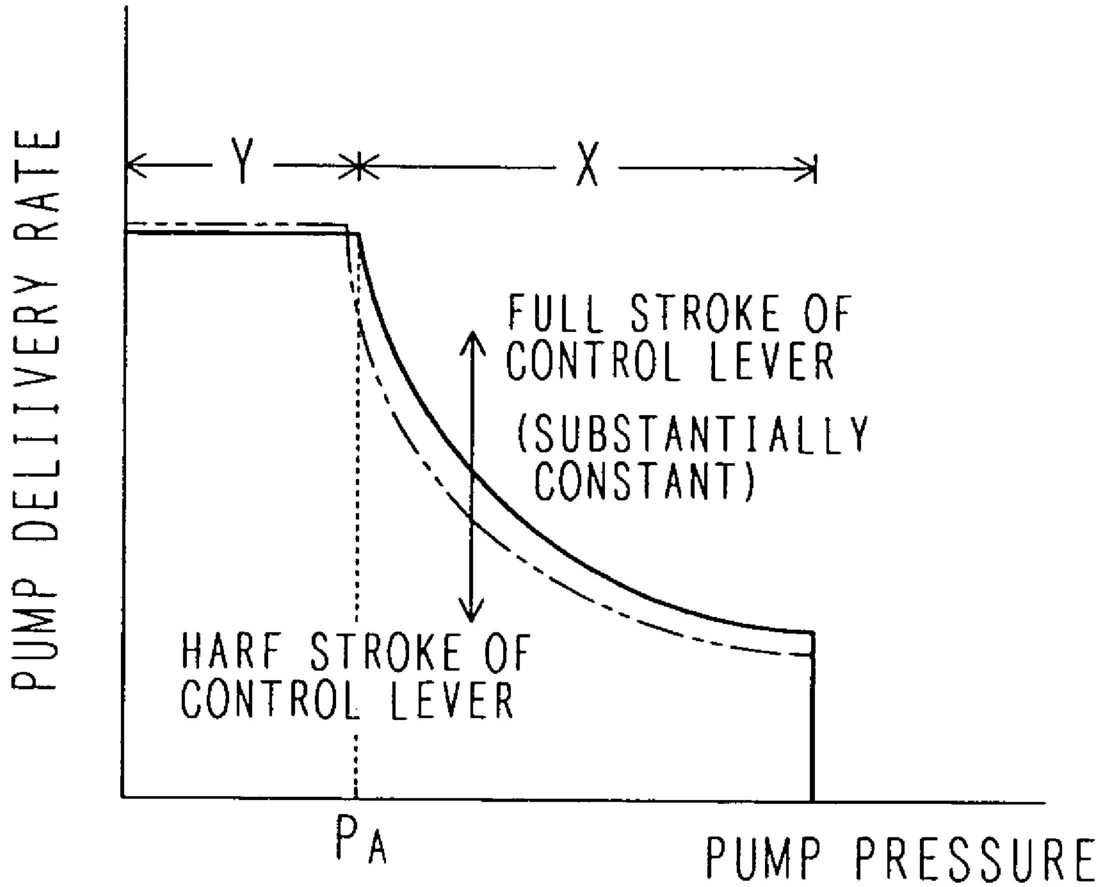
FIG. 16 is a graph showing change of a pumping rate characteristic including pump absorption horsepower when the control lever is operated in the system comprising the auto-acceleration system according to one embodiment of the present invention.

FIGS. 11 and 12 are graphs showing, as a comparative example, changes of a torque matching point and an output horsepower matching point, respectively, when a control lever is operated in a system comprising the known pump absorption torque control means and auto-acceleration control means (such as disclosed in, e.g., Japanese Patent No. 3419661). FIG. 13 is a graph showing, as a comparative example, change of a pumping rate characteristic when the control lever is operated in the system comprising the known pump absorption torque control means and auto-acceleration control means. FIGS. 14 and 15 are graphs showing changes of a torque matching point and an output horsepower matching point, respectively, when the control lever is operated in the system of the present invention. FIG. 16 is a graph showing change of a pumping rate characteristic when the control lever is operated in the system of the present invention. In FIGS. 11 and 14, the horizontal axis represents the engine revolution speed, and the vertical axis represents the engine output torque. In FIGS. 12 and 15, the horizontal axis represents the engine revolution speed, and the vertical axis represents the engine output horsepower. In FIGS. 13 and 16, the horizontal axis represents the pump delivery pressure (average value of the delivery pressures of the hydraulic pumps 1, 2), and the vertical axis represents the pump delivery rate (total of the delivery rates of the hydraulic pumps 1, 2). Further, in FIGS. 13 and 16, X represents a control region of the pump absorption torque control means, and Y represents a region where the pump delivery pressure is lower than that in the control region X.

FIGS. 11-13 (comparative examples) and FIGS. 14-16 (invention) show changes resulting upon the target engine revolution speed NR1 being reduced to NA (see FIG. 8) with the auto-acceleration control, for example, when the operation input from any of the control levers 40*c*, 42*c* of the operation pilot devices 40-43 (hereinafter referred to as the "lever operation input from the operation command means") is changed from full stroke to half stroke on condition that the target engine revolution speed NR1 is set to the maximum rated revolution speed Nmax (see FIG. 8). The system of the comparative example is assumed to be known one in which the maximum absorption torque TR of the pump absorption torque control means is not changed (constant) when the operation input from any of the operation pilot devices 40-43, etc. is changed from full stroke to half stroke and the target engine revolution speed is lowered to NA with the auto-acceleration control means, and the auto-acceleration control means is assumed to be known one, as shown in FIG. 7 of Japanese Patent No. 3419661, in which the reference revolution-speed decrease modification amount computing section 700*v* is not provided in the engine processing functions shown in FIG. 9.

COMPARATIVE EXAMPLE

When the lever operation input from the operation command means is changed from full stroke to half stroke, the engine output torque, the engine output horsepower, and the pump delivery rate are changed as follows.

When the lever operation input from the operation command means is changed from full stroke to half stroke, the target engine revolution speed is lowered with the auto-acceleration control. In spite of the lowering of the target engine revolution speed, the maximum absorption torque TR of the pump absorption torque control is constant, and the matching point with the maximum torque is changed from A1 to B1 as shown in FIG. 11. Correspondingly, the matching point with the engine output horsepower is changed from A2 to B2 as shown in FIG. 12, and the engine output horsepower at the matching point B is reduced to some extent.

The pump maximum tilting resulting with the pump delivery pressure being in the pump absorption torque control region Y where the pump delivery pressure is lower than that in the region X is set to a certain value in advance depending on the mechanism conditions, etc. of the hydraulic pumps 1, 2. In the case of the pump delivery pressure being in such a relatively low pressure range, when the engine revolution speed is lowered with the auto-acceleration control, the pump maximum delivery rate is also reduced in proportion to the lowering of the engine revolution speed as shown in FIG. 13.

If the pump delivery pressure is medium or relatively high and is in the pump absorption torque control region X, the maximum absorption torque TR is constant and therefore the maximum pump tilting with the pump absorption torque control is also constant even when the engine revolution speed is lowered with the auto-acceleration control. As a result, upon the lowering of the engine revolution speed with the auto-acceleration control, the pump maximum delivery rate is reduced in proportion to the lowering of the engine revolution speed as shown in FIG. 13.

Thus, in the comparative example, when the lever operation input from the operation command means is changed from full stroke to half stroke, the pump maximum delivery rate is reduced over the entire regions X and Y of the pump delivery pressure corresponding to the lowering of the engine revolution speed with the auto-acceleration control.

Further, when the lever operation input from the operation command means is reduced from full stroke to half stroke, the opening area of a corresponding flow control valve is reduced and the amount of the hydraulic fluid supplied to the actuator is also reduced correspondingly. In the system including the auto-acceleration control means, because the pump maximum delivery rate is reduced as described above, the amount of the hydraulic fluid supplied to the actuator is further reduced. This results in a possibility that an actuator maximum speed is extremely decreased and the working efficiency is reduced.

If the pump delivery pressure is in the pump absorption torque control region Y where the pump delivery pressure is lower than that in the region X, the consumed horsepower is small because of the region Y locating outside the range of pump absorption torque control, and the engine output horsepower is within the capacity. Accordingly, it is not required to reduce the pump maximum delivery rate when the engine revolution speed is lowered. Nevertheless, in the comparative example, the pump maximum delivery rate is reduced in the region Y with the lowering of the engine revolution speed. As a result, the actuator maximum speed is decreased.

Also, when the engine revolution speed is in a range from a medium to maximum speed, there is a tendency that, as shown in FIG. 11, the engine output torque is increased as the engine revolution speed lowers. With the pump absorption torque control of the comparative example, when the target engine revolution speed is lowered from a maximum point A1 (Nmax) to a point B1 (NA), the maximum absorption torque TR in the pump absorption torque control is kept constant. Therefore, an allowance of the engine output torque with respect to the maximum absorption torque TR is increased and an allowance of the engine output horsepower is also increased. Nevertheless, in the comparative example, the pump maximum delivery rate is reduced with the lowering of the engine revolution speed in the pump absorption torque control region X, as described above, thus resulting in a decrease of the actuator maximum speed.

In the comparative example, as described above, in spite of the engine output horsepower being within the capacity over the entire range of the pump delivery pressure (i.e., the pump absorption torque control region X and the region Y where the pump delivery pressure is lower than that in the region X), the pump maximum delivery rate is reduced when the engine revolution speed is lowered with the auto-acceleration control. Consequently, the actuator maximum speed is decreased, the working efficiency is reduced, and the engine output power cannot be effectively utilized.

<Present Invention>

When the lever operation input from the operation command means is changed from full stroke to half stroke, the engine output torque, the engine output horsepower, and the pump delivery rate are changed as follows.

At the time when the lever operation input from the operation command means is changed from full stroke to half stroke, if the pump delivery pressure is in the pump absorption torque control region Y where the pump delivery pressure is lower than that in the region X, the lowering of the target engine revolution speed with the auto-acceleration control is not caused for the reason that the reference revolution-speed decrease modification amount computing section 700*v* computes the modification amount DNLR to be 0 because of the pump delivery pressure<PA.

Also, if the pump delivery pressure is medium or relatively high and is in the pump absorption torque control region X, the target engine revolution speed is lowered with the auto-acceleration control for the reason that the reference revolution-speed decrease modification amount computing section 700*v* computes the modification amount DNLR to be 1 because of the pump delivery pressure>PB. Upon the lowering of the target engine revolution speed, the pump maximum absorption torque TR computed in the pump maximum absorption torque computing section 70*i* is increased from TRB to TRmax. Therefore, the matching point with the maximum torque is changed from A1 to C1 as shown in FIG. 14. Correspondingly, the matching point with the engine output horsepower is changed from A2 to C2 as shown in FIG. 15. In other words, the engine output horsepower at the matching point C2 is increased corresponding to the increase of the pump maximum absorption torque TR.

As in the comparative example, the pump maximum tilting resulting with the pump delivery pressure being in the pump absorption torque control region Y where the pump delivery pressure is lower than that in the region X is set to a certain value in advance depending on the mechanism conditions, etc. of the hydraulic pumps 1, 2, and it is given as the preset certain value. At this time, however, the modification amount DNLR computed in the reference revolution-speed decrease modification amount computing section 700*v* is 0 and the lowering of the target engine revolution speed with the auto-acceleration control is not caused. Accordingly, even when the lever operation input is changed from full stroke to half stroke, the engine revolution speed is not lowered and the pump maximum delivery rate is also not reduced as shown in FIG. 16. As a result, the actuator maximum speed can be ensured and the working efficiency can be increased. Further, if the pump delivery pressure is in the region Y, the engine output horsepower is within the capacity because of the region Y locating outside the range of the pump absorption torque control. Hence the engine output can be effectively utilized by not reducing the pump maximum delivery rate.

If the pump delivery pressure is medium or relatively high and is in the pump absorption torque control region X, the engine revolution speed is lowered with the auto-acceleration control. At this time, however, because the maximum absorption torque TR is increased from TRB to TRmax, the pump maximum tilting in the pump absorption torque control is also increased correspondingly. Accordingly, even when the engine revolution speed is lowered with the auto-acceleration control, the pump maximum delivery rate is hardly reduced as shown in FIG. 16. As a result, the actuator maximum speed can be ensured and the working efficiency can be increased. Further, even when the maximum absorption torque TR is increased with the lowering of the engine revolution speed in the case of the pump delivery pressure being in the region X, the engine output torque has a characteristic to increase as the engine revolution speed lowers, and the engine output horsepower is also within the capacity. Hence the engine output power can be effectively utilized by not reducing the pump maximum delivery rate. In addition, since the engine revolution speed is lowered, fuel economy is improved.

The following advantages can be obtained with this embodiment.

(1) At the time when the lever operation input from the operation command means is changed from full stroke to half stroke, if the pump delivery pressure is in the pump absorption torque control region Y where the pump delivery pressure is lower than that in the region X, the lowering of the target engine revolution speed with the auto-acceleration control is not caused because the reference revolution-speed decrease modification amount computing section 700*v* computes the modification amount DNLR to be 0. Thus, the engine revolution speed can be increased and decreased depending on the operation input from the operation command means with the auto-acceleration control, while ensuring the energy saving effect and workability. Further, it is possible to effectively utilize the engine output power and to realize higher working efficiency.

(2) At the time when the lever operation input from the operation command means is changed from full stroke to half stroke, if the pump delivery pressure is medium or relatively high and is in the pump absorption torque control region X, the system is controlled such that the maximum absorption torque TR is increased from TRB to TRmax. Therefore, even when the engine revolution speed is lowered with the auto-acceleration control, the pump maximum delivery rate is hardly changed. As a result, the actuator maximum speed can be ensured and the working efficiency can be increased. Further, since the engine output torque has a characteristic to increase as the engine revolution speed lowers and the engine output horsepower is within the capacity, the engine output power can be effectively utilized by not reducing the pump maximum delivery rate. In addition, since the engine revolution speed is lowered, fuel economy is improved.

(3) Thus, according to this embodiment, when the lever operation input from the operation command means is changed from full stroke to half stroke, a reduction of the pump maximum delivery rate is suppressed to a minimum over the entire range of the pump delivery pressure (i.e., the pump absorption torque control region X and the region Y where the pump delivery pressure is lower than that in the region X). Consequently, the actuator maximum speed can be ensured and the working efficiency can be increased over the entire range of the pump delivery pressure. In addition, it is possible to effectively utilize the engine output power and to improve fuel economy.

(4) The pump control section shown in FIG. 7 operates such that, when the target delivery rates QR11, QR21 of the hydraulic pumps 1, 2 computed in the reference pumping rate computing sections 70*a*, 70*b* and the target pumping rate computing sections 70*c*, 70*d* are varied with changes of the control pilot pressures PL1, PL2 of the hydraulic pumps 1, 2 due to changes of the operation pilot pressures, the target delivery rates QR11, QR21 are divided by the actual engine revolution speed NE1 in the target pump tilting computing sections 70*e*, 70*f* to obtain the target tiltings θR1, θR2. Therefore, the delivery rates of the hydraulic pumps 1, 2 are provided as flow rates depending on the target delivery rates QR11, QR21. Even if a response is delayed in the control of the engine revolution speed when there occurs a difference between the target revolution speed NR1 and the actual revolution speed NE1 of the engine 10, the delivery rates of the hydraulic pumps 1, 2 can be controlled with a good response depending on the changes of the operation pilot pressures (i.e., the changes of the target delivery rates QR11, QR21), and superior operability can be obtained.

(5) Since the reference delivery rates QR10, QR20 computed in the reference pumping rate computing sections 70*a*, 70*b* are not directly set as the target delivery rates, but the reference delivery rates QR10, QR20 are converted to the target delivery rates QR11, QR21 corresponding to the target engine revolution speed NR1 in the target pumping rate computing sections 70*c*, 70*d*, the pumping rate modification can be performed corresponding to the target engine revolution speed inputted in accordance with the operator's intention in reference flow rate metering of the reference delivery rates QR10, QR20. Accordingly, when the operator sets the target engine revolution speed NR1 to be small with intent to perform fine operation, the pump delivery rate is given as a small flow rate, and when the operator sets the target engine revolution speed NR1 to be large, the pump delivery rate is given as a large flow rate. Further, in any case, a metering characteristic can be ensured over the entire range of the lever operation input.

(6) The engine control section shown in FIG. 9 operates as follows. In the arm-crowding operation and the track operation, the revolution-speed decrease modification amount DND based on the operation pilot pressure is computed in the computing sections 700*q*, 700*r* and the maximum value selecting section 700*s* by using the revolution speed modification gain KNP based on the pump delivery pressure, which is modified in accordance with the modification gain KACH or KTRH based on the operation pilot pressure. Then, the reference target engine revolution speed NRO is modified in accordance with the revolution-speed decrease modification amount DND and the revolution-speed increase modification amount DNH, whereby the engine revolution speed is controlled. Therefore, the engine revolution speed is raised depending on not only an increase of the operation input from the control lever or pedal, but also a rise of the pump delivery pressure. As a result, powerful excavation can be performed with the arm-crowding operation, and the excavator can travel at a higher speed or in a powerful way with the track operation. Meanwhile, in the other operations than the arm-crowding and track operations, because the modification gain KACH or KTRH is set to 0, the reference target engine revolution speed NRO is modified in accordance with the revolution-speed decrease modification amount DND based on the operation pilot pressure, whereby the engine revolution speed is controlled. Accordingly, in the operation in which the pump delivery pressure varies depending on the posture of the front operating mechanism, such as the boom-raising operation, the engine revolution speed is not changed even with the variation of the pump delivery pressure, and good operability can be ensured. Furthermore, when the operation input is small, the engine revolution speed is lowered and a considerable energy saving effect is obtained.

(7) When the operator sets the reference target revolution speed NRO to be low, the reference revolution-speed decrease modification amount DNL and the reference revolution-speed increase modification amount DNP are computed as small values in the reference revolution-speed decrease modification amount computing section 700*a* and the reference revolution-speed increase modification amount computing section 700*b*, respectively, thus making smaller the modification amounts DND and DNH for the reference target revolution speed NRO. Therefore, in work in which the operator performs the operation while using a low range of the engine revolution speed, such as leveling work and a load lifting work, the modification width of the engine target revolution speed is automatically reduced and fine operation becomes easier to perform.

(8) In the modification gain computing sections 700*d*1-700*d*4, the change of the engine revolution speed with respect to the change of the input from the control lever or pedal (i.e., change of the operation pilot pressure) is set in advance as the modification gain for each actuator operated. Therefore, satisfactory workability in match with characteristics of the individual actuators can be obtained.

For example, in the boom-raising computing section 700*d*1, the gradient of the modification gain KBU is set to be small in the fine operation range, and the change of the engine revolution-speed decrease modification amount DND in the fine operation range is reduced. Therefore, it is easier to perform work requiring the fine boom-raising operation, such as positioning made in load lifting work and leveling work.

In the arm-crowding computing section 700*d*2, the gradient of the modification gain KAC is set to be small near the full lever stroke, and the change of the engine revolution-speed decrease modification amount DND near the full lever stroke is reduced. Therefore, excavation can be performed with the arm-crowding operation while suppressing fluctuations of the engine revolution speed near the full lever stroke.

In the swing computing section 700*d*3, the gradient of the gain is set to be small in an intermediate revolution range. Therefore, the swing operation can be performed while suppressing fluctuations of the engine revolution speed in the intermediate revolution range.

In the track computing section 700*d*4, the modification gain KTR is set to be small from a point just in the small stroke range. Therefore, the engine revolution speed is raised with the track operation in the small stroke range, thus enabling the excavator to travel in a powerful way.

Further, the engine revolution speed at the full lever stroke can be set changeable for each actuator. For example, in the boom-raising and arm-crowding computing sections 700*d*1, 700*d*2, the modification gains KBU, KAC at the full lever stroke are set to 0 such that the engine revolution speed is relatively high and the delivery rate of the hydraulic pumps 1, 2 is increased. It is hence possible to lift a heavy load with the boom-raising operation and to perform excavation in a powerful way with the arm-crowding operation. Also, in the track computing section 700*d*4, the modification gain KTR at the full lever stroke is set to 0. Similarly to the above case, therefore, the engine revolution speed is relatively high and the excavator can travel at a higher speed. In the other operations, the modification gains at the full lever stroke have values larger than 0, the engine revolution speed is set to a relatively low level and the energy saving effect is obtained.

(9) In the operation other than the above-described ones, the engine revolution speed is modified by using the modification gains PL1, PL2 computed in the computing sections 700*d*5, 700*d*6 as representatives.

While, in the above embodiments, the auto-acceleration control has been described as one example for increasing and decreasing the engine revolution speed with an implement other than input means such as a throttle dial, the present invention can also be applied to the case where the engine revolution speed is lowered by selecting an economy mode in mode selection control.

The invention claimed is:

1. A control system for a hydraulic construction machine comprising:

a prime mover;

at least one variable displacement hydraulic pump driven by said prime mover;

at least one hydraulic actuator driven by a hydraulic fluid from said hydraulic pump;

input means for commanding a reference target revolution speed of said prime mover;

revolution speed control means for controlling a revolution speed of said prime mover; and operation command means for commanding operation of said hydraulic actuator, wherein said control system comprises:

target revolution speed setting means for setting a target revolution speed of said revolution speed control means based on the reference target revolution speed;

operation detecting means for detecting a command input from said operation command means; and load pressure detecting means for detecting a load pressure of said hydraulic pump, and wherein said target revolution speed setting means comprises;

a first modifying section for changing the target revolution speed depending on the command input from said operation command means, which is detected by said operation detecting means; and a second modifying section for modifying change of the target revolution speed, which is given by said first modifying section, depending on the load pressure detected by said load pressure detecting means.

2. The control system for the hydraulic construction machine according to claim 1, wherein said second modifying section modifies the change of the target revolution speed, which is given by said first modifying section, to be a minimum when the load pressure detected by said load pressure detecting means is lower than a certain value.

3. The control system for the hydraulic construction machine according to claim 1, further comprising:

pump absorption torque control means for making control to reduce a displacement of said hydraulic pump corresponding to a rise of the load pressure of said hydraulic pump such that maximum absorption torque of said hydraulic pump does not exceed a setting value, wherein said second modifying section modifies the change of the target revolution speed, which is given by said first modifying section, to be a minimum in a control region Y of said pump absorption torque control means where the load pressure of said hydraulic pump is lower than that in a control region X thereof.

4. The control system for the hydraulic construction machine according to claim 1, further comprising:

pump absorption torque control means for, when the load pressure of said hydraulic pump becomes higher than a first value, making control to reduce a displacement of said hydraulic pump corresponding to a rise of the load pressure of said hydraulic pump such that maximum absorption torque of said hydraulic pump does not exceed a setting value, wherein said second modifying section modifies the change of the target revolution speed, which is given by said first modifying section, to be a minimum when the load pressure detected by said load pressure detecting means is lower than a second value, the second value being set to near the first value.

5. The control system for the hydraulic construction machine according to claim 1, wherein said second modifying section computes a revolution speed modification value which is changed depending on the load pressure detected by said load pressure detecting means, thereby modifying the change of the target revolution speed, which is given by the first modifying section, in accordance with the computed revolution speed modification value.

6. The control system for the hydraulic construction machine according to claim 1, wherein said first modifying section includes first means for computing a first revolution speed modification value corresponding to the operation input from said operation command means, which is detected by said operation detecting means, said second modifying section includes second means for computing a second revolution speed modification value corresponding to the magnitude of the load pressure detected by said load detecting means, and third means for executing computation based on the first revolution speed modification value and the second revolution speed modification value, to thereby obtain a third revolution speed modification value, and said first and second modifying sections further include fourth means for executing computation based on the third revolution speed modification value and the reference target revolution speed, to thereby obtain the target revolution speed.

7. The control system for the hydraulic construction machine according to claim 6, wherein said first means is means for computing, as the first revolution speed modification value, a first modification revolution speed, said second means is means for computing, as the second revolution speed modification value, a modification coefficient, said third means is means for multiplying the first modification revolution speed by the modification coefficient to obtain, as the third revolution speed modification value, a second modification revolution speed, and said fourth means is means for subtracting the second modification revolution speed from the reference target revolution speed.

8. The control system for the hydraulic construction machine according to claim 7, wherein said second means computes the modification coefficient such that the modification coefficient is 0 when a magnitude of the load pressure is smaller than a preset first value, the modification coefficient is increased from 0 when the magnitude of the load pressure exceeds the first value, and the modification coefficient becomes 1 when the magnitude of the load pressure reaches a preset second value.

9. The control system for the hydraulic construction machine according to claim 1, further comprising:

pump absorption torque control means for making control to reduce a displacement of said hydraulic pump corresponding to a rise of the load pressure of said hydraulic pump such that maximum absorption torque of said hydraulic pump does not exceed a setting value; and maximum absorption torque modifying means for modifying the setting value to increase the maximum absorption torque of said hydraulic pump when the target revolution speed is modified to be lower than a preset rated revolution speed by said first modifying section.

10. A control system for a hydraulic construction machine comprising:

a prime mover;

at least one variable displacement hydraulic pump driven by said prime mover;

at least one hydraulic actuator driven by a hydraulic fluid from said hydraulic pump;

input means for commanding a reference target revolution speed of said prime mover; and revolution speed control means for controlling a revolution speed of said prime mover, wherein said control system comprises:

target revolution speed setting means for setting, separately from the target revolution speed set based on the reference target revolution speed, a target revolution speed of said revolution speed control means to a revolution speed lower than a maximum rated revolution speed;

pump absorption torque control means for making control to reduce a displacement of said hydraulic pump corresponding to a rise of the load pressure of said hydraulic pump such that maximum absorption torque of said hydraulic pump does not exceed a setting value; and maximum absorption torque modifying means for modifying the setting value of the maximum absorption torque such that when the target revolution speed of said revolution speed control means is set by said target revolution speed setting means to the revolution speed lower than the maximum rated revolution speed, the maximum absorption torque of said hydraulic pump is increased from the maximum absorption torque resulting when the target revolution speed of said revolution speed control means is at the maximum rated revolution speed, thus minimizing an amount of decrease of a maximum delivery rate of said hydraulic pump with the increase of the maximum absorption torque.

11. A control system for a hydraulic construction machine comprising:

a prime mover;

at least one variable displacement hydraulic pump driven by said prime mover;

at least one hydraulic actuator driven by a hydraulic fluid from said hydraulic pump;

input means for commanding a reference target revolution speed of said prime mover;

revolution speed control means for controlling a revolution speed of said prime mover; and operation command means for commanding operation of said hydraulic actuator, wherein said control system comprises:

operation detecting means for detecting a command input from said operation command means;

target revolution speed setting means for modifying the reference target revolution speed corresponding to the command input from said operation command means, which is detected by said operation detecting means, and setting a target revolution speed of said revolution speed control means;

pump absorption torque control means for making control to reduce a displacement of said hydraulic pump corresponding to a rise of the load pressure of said hydraulic pump such that maximum absorption torque of said hydraulic pump does not exceed a setting value; and maximum absorption torque modifying means for modifying the setting value of the maximum absorption torque such that when the target revolution speed of said revolution speed control means is set by said target revolution speed setting means to a revolution speed lower than a maximum rated revolution speed, the maximum absorption torque of said hydraulic pump is increased from the maximum absorption torque resulting when the target revolution speed of said revolution speed control means is at the maximum rated revolution speed, thus minimizing an amount of decrease of a maximum delivery rate of said hydraulic pump with the increase of the maximum absorption torque.

* * * * *